(12) United States Patent
Fukuda

(10) Patent No.: US 8,705,901 B2
(45) Date of Patent: Apr. 22, 2014

(54) METHOD FOR MAKING POLARIZATION ROTATOR AND THE POLARIZATION ROTATOR MADE THEREBY

(75) Inventor: Chie Fukuda, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 141 days.

(21) Appl. No.: 13/400,826

(22) Filed: Feb. 21, 2012

(65) Prior Publication Data

US 2012/0213465 A1 Aug. 23, 2012

(30) Foreign Application Priority Data

Feb. 23, 2011 (JP) ................................. 2011-037545

(51) Int. Cl.
*G02B 6/44* (2006.01)
*G02B 6/00* (2006.01)
*H01L 31/00* (2006.01)

(52) U.S. Cl.
USPC ................ 385/11; 385/2; 438/33; 372/45.01; 372/22; 398/204; 359/246

(58) Field of Classification Search
CPC .......... G02B 6/00; G02B 6/16; G02B 27/283; G02B 5/3058; G02B 27/09; H01L 31/00; H01L 33/00; H01L 23/66; H04B 10/00
USPC .................. 385/11, 2; 438/33; 372/45.01, 22; 359/246
See application file for complete search history.

(56) References Cited

U.S. PATENT DOCUMENTS

| | | | | |
|---|---|---|---|---|
| 5,309,275 A | * | 5/1994 | Nishimura et al. | ........... 359/344 |
| 6,542,528 B1 | * | 4/2003 | Sato et al. | ................. 372/45.01 |
| 6,693,941 B1 | * | 2/2004 | Okazaki et al. | ................. 372/75 |
| 6,765,935 B2 | * | 7/2004 | Kimura et al. | ............. 372/29.02 |
| 6,782,028 B2 | * | 8/2004 | Tsukiji et al. | ............. 372/50.22 |
| 6,845,117 B2 | * | 1/2005 | Wakisaka et al. | .......... 372/46.01 |
| 6,885,687 B2 | * | 4/2005 | Hayakawa | .................. 372/45.01 |
| 8,213,751 B1 | * | 7/2012 | Ho et al. | .......................... 385/14 |
| 2001/0026670 A1 | * | 10/2001 | Takizawa et al. | ............. 385/129 |
| 2002/0009102 A1 | * | 1/2002 | Hayakawa | ....................... 372/22 |
| 2002/0093738 A1 | * | 7/2002 | Kimura et al. | ................. 359/497 |
| 2002/0097766 A1 | * | 7/2002 | Tsukiji et al. | .................... 372/50 |
| 2002/0105984 A1 | * | 8/2002 | Yamamoto et al. | ............. 372/44 |
| 2003/0086174 A1 | * | 5/2003 | Wakisaka et al. | ............. 359/566 |
| 2012/0202304 A1 | * | 8/2012 | Yoshizumi et al. | ............. 438/33 |
| 2012/0258557 A1 | * | 10/2012 | Yoshizumi et al. | ............. 438/33 |

FOREIGN PATENT DOCUMENTS

JP 2010-88110 4/2010

* cited by examiner

*Primary Examiner* — K. Cyrus Kianni
(74) *Attorney, Agent, or Firm* — Smith, Gambrell & Russell, LLP

(57) ABSTRACT

A method for making a polarization rotator includes the steps of forming a structure including a semiconductor substrate and a mesa part, forming a first semiconductor layer on a main surface of the semiconductor substrate and around the mesa part, forming a second semiconductor layer on the first semiconductor layer, forming a semiconductor laminate by forming a third semiconductor layer on the second semiconductor layer, forming a mask layer on the third semiconductor layer, forming a mesa including a first semiconductor core by etching the semiconductor laminate, and forming a first semiconductor cladding by forming a fourth semiconductor layer around the mesa. The first semiconductor core and the first semiconductor cladding form a polarization rotating unit. An inclined surface of a mesa-part-adjacent portion extends in a second direction forming an acute angle with the main surface. An inclined portion of the second semiconductor layer extends in the second direction.

6 Claims, 17 Drawing Sheets

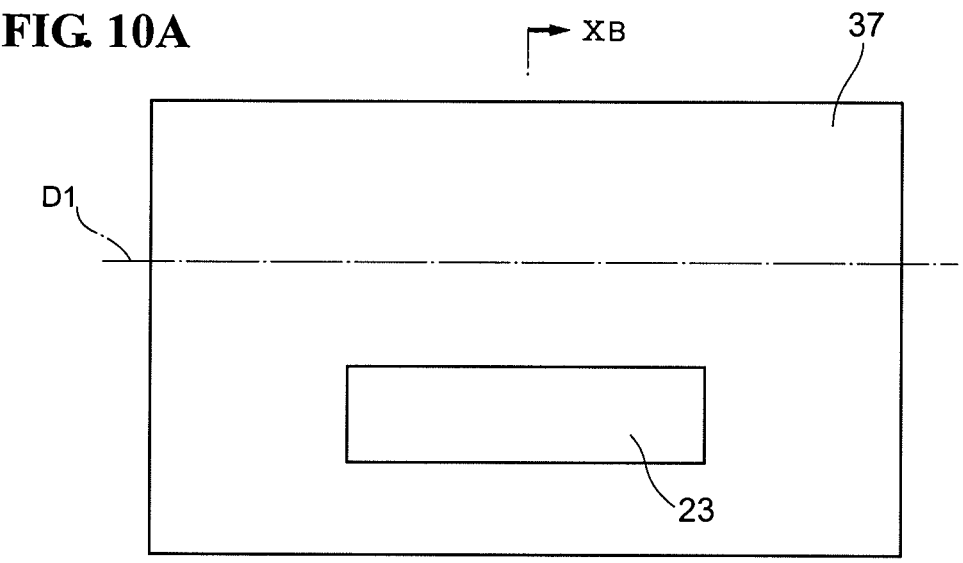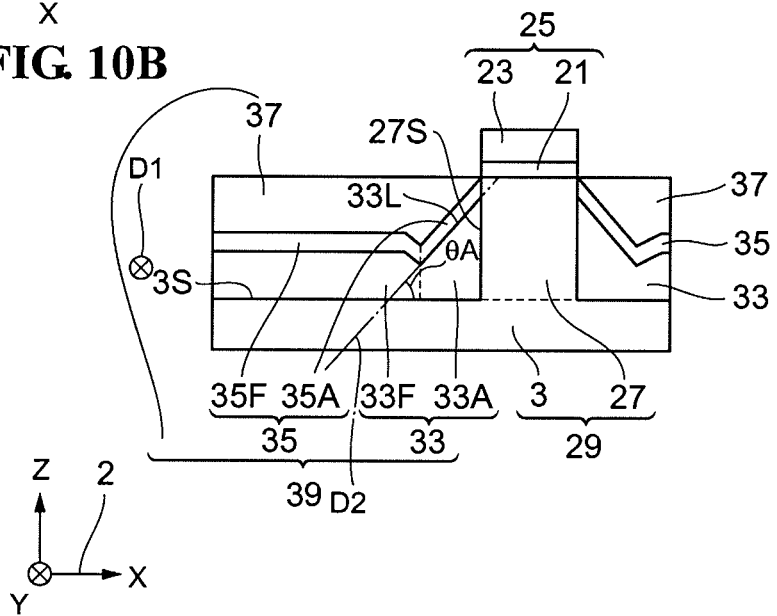

METHOD FOR MAKING POLARIZATION ROTATOR AND THE POLARIZATION ROTATOR MADE THEREBY

BACKGROUND OF THE INVENTION

1. Field of the Invention

The present invention relates to a method for making a polarization rotator and the polarization rotator made thereby.

2. Description of the Related Art

Japanese Unexamined Patent Application Publication No. 2010-88110 describes a polarization converter (polarization rotator). The polarization rotator includes an asymmetric core constituted by a dielectric waveguide and a cladding in which the asymmetric core is embedded. The asymmetric core of the polarization rotator has a cutaway shape to present an inclined surface over the length thereof (in the waveguide direction). The inclined surface of the asymmetric core forms a predetermined acute angle with a surface on which the polarization rotator is disposed (e.g., a surface of a substrate). Japanese Unexamined Patent Application Publication No. 2010-88110 states that because of the asymmetric shape of the core, the polarization rotator can rotate a plane of polarization guided therein.

A polarization rotator is used, for example, in a polarization division multiplexing optical transmission system to convert a polarization state of a polarized optical signal. For example, an optical signal having a transverse electric (TE) polarization can be converted to an optical signal having a transverse magnetic (TM) polarization by rotating a plane of polarization of the optical signal using the polarization rotator.

In the polarization division multiplexing optical transmission system described above, semiconductor optical devices are generally used for transmitting and receiving optical signals. Specifically, a semiconductor light-emitting device, such as a semiconductor laser, is used as an optical transmitter. On the other hand, a semiconductor light-receiving device, such as a semiconductor photodiode, is used as an optical receiver. For size reduction of the polarization division multiplexing optical transmission system, it is preferable that the polarization rotator and the semiconductor optical devices for transmitting and receiving optical signals be monolithically integrated on the same semiconductor substrate.

However, the polarization rotator described in Japanese Unexamined Patent Application Publication No. 2010-88110 is made of a dielectric material. It is difficult to monolithically integrate, on the same semiconductor substrate, the semiconductor optical devices and the polarization rotator made of a material other than a semiconductor material. Therefore, this polarization rotator is generally inserted in an optical waveguide, such as an optical fiber. If the semiconductor optical devices and the polarization rotator made of materials with different refractive indices are monolithically integrated on the same semiconductor substrate, the optical axes of the semiconductor optical devices and the polarization rotator need to be aligned precisely on the micrometer scale. Moreover, light reflected and returned from an optically coupled portion between the polarization rotator and the semiconductor optical devices may adversely affect the operation of the semiconductor optical devices.

As a solution to this, a polarization rotator having the same shape as that of the polarization rotator described in Japanese Unexamined Patent Application Publication No. 2010-88110 may be formed, using a semiconductor material, integrally with the semiconductor optical devices. This may solve the problems associated with the alignment of optical axes and the reflected and returned light that arise when the polarization rotator and the semiconductor optical devices are monolithically integrated on the same semiconductor substrate.

However, a polarization rotator having the above-described shape and made of a semiconductor material is not known. Generally, semiconductor optical devices are made on a semiconductor substrate by using an epitaxial growth method. Therefore, to integrally form a polarization rotator and the semiconductor optical devices, the epitaxial growth method may be used to form the polarization rotator. However, it is difficult to growth a semiconductor layer in a desired shape on a semiconductor substrate, the semiconductor layer forming an acute angle of inclination with a surface of the semiconductor substrate. This means that it is difficult to form a polarization rotator having the same shape as that of the polarization rotator described in Japanese Unexamined Patent Application Publication No. 2010-88110 using a semiconductor material. Japanese Unexamined Patent Application Publication No. 2010-88110 does not mention any technique that forms a polarization rotator of semiconductor material.

SUMMARY OF THE INVENTION

A method for making a polarization rotator according to an aspect of the present invention includes the steps of forming a structure including a semiconductor substrate and a mesa part, the semiconductor substrate having a main surface, the mesa part extending in a first direction parallel to the main surface of the semiconductor substrate; forming a first semiconductor layer on the main surface of the semiconductor substrate and on a side face of the mesa part, the first semiconductor layer having a mesa-part-adjacent portion in contact with the side face of the mesa part, at least part of the mesa-part-adjacent portion having an inclined surface; forming a second semiconductor layer on the first semiconductor layer, the second semiconductor layer having an inclined portion located on the inclined surface of the mesa-part-adjacent portion; forming a semiconductor laminate by forming a third semiconductor layer on the second semiconductor layer, the semiconductor laminate including the first semiconductor layer, the second semiconductor layer, and the third semiconductor layer; forming a mask layer on a surface of the third semiconductor layer, the mask layer extending in the first direction; forming a stripe-shaped mesa by etching the semiconductor laminate using the mask layer, the stripe-shaped mesa including a first semiconductor core constituted by at least part of the inclined portion of the second semiconductor layer; and forming a first semiconductor cladding by forming a fourth semiconductor layer on a side face of the stripe-shaped mesa, the first semiconductor cladding surrounding the first semiconductor core. The first semiconductor core and the first semiconductor cladding form a polarization rotating unit of the polarization rotator. The inclined surface of the mesa-part-adjacent portion extends in a second direction that forms an acute angle with the main surface of the semiconductor substrate. In a cross section perpendicular to the first direction, the inclined portion of the second semiconductor layer extends in the second direction.

In the method according to the aspect of the present invention, the first semiconductor core and the first semiconductor cladding are made of semiconductor materials.

In the method according to the aspect of the present invention, the first semiconductor layer having the mesa-part-adjacent portion is formed in the step of forming the first semiconductor layer. The mesa-part-adjacent portion has the inclined surface, which extends in the second direction that forms an acute angle with the main surface of the semiconductor substrate. The mesa-part-adjacent portion having the inclined surface can be easily formed using the structure formed in the step of forming the structure. That is, in the step of forming the first semiconductor layer, by simply depositing the first semiconductor layer on the main surface of the semiconductor substrate such that the first semiconductor layer is in contact with the side face of the mesa part of the structure, the semiconductor material forming the first semiconductor layer is deposited with a thickness which increases toward the mesa part. It is thus possible to easily form the mesa-part-adjacent portion having the inclined surface.

In the step of forming the second semiconductor layer, the inclined portion of the second semiconductor layer extending in the second direction can be formed by simply forming the second semiconductor layer on the first semiconductor layer. The inclined portion can thus be easily formed. Then, by etching the semiconductor laminate, at least part of the inclined portion becomes the first semiconductor core. Thus, with the method according to the aspect of the present invention, it is possible to easily form the first semiconductor core inclined with respect to the main surface of the semiconductor substrate.

With the method according to the aspect of the present invention, it is possible to obtain a polarization rotator made of semiconductor materials, and to easily form a core inclined with respect to a main surface of a semiconductor substrate.

In the method according to the aspect of the present invention, the acute angle formed by the main surface of the semiconductor substrate and the second direction is preferably between 20 degrees and 80 degrees inclusive. When the angle is greater than or equal to 20 degrees, if linearly polarized light having a plane of polarization parallel or perpendicular to the main surface is incident on the polarization rotating unit, it is possible to achieve a sufficiently high rotation efficiency of the plane of polarization in the polarization rotating unit. It is thus possible to reduce the size of the polarization rotator. In the same manner, when the angle is smaller than or equal to 80 degrees, it is possible to achieve a sufficiently high rotation efficiency of the plane of polarization in the polarization rotating unit. It is thus possible to reduce the size of the polarization rotator.

In the method according to the aspect of the present invention, the step of forming the structure preferably includes the steps of forming a mask on a portion of the semiconductor substrate, the portion being to be formed into the mesa part; and forming the mesa part by etching the semiconductor substrate using the mask.

The method according to the aspect of the present invention preferably further includes the step of forming a first waveguide on the semiconductor substrate, the first waveguide including a second semiconductor core and a second semiconductor cladding, the first waveguide being disposed adjacent to a first end face of the polarization rotating unit in the first direction and optically coupled to the polarization rotating unit, the second semiconductor core extending in the first direction and also extending in a third direction different from the second direction in a cross section perpendicular to the first direction, the second semiconductor cladding surrounding the second semiconductor core.

The direction of the slow axis of the first waveguide differs from the direction of the slow axis of the polarization rotating unit, as viewed in the first direction. Therefore, the first waveguide and the polarization rotating unit differ in polarization-plane rotation characteristics for the same polarization. Thus, with the method according to the aspect of the present invention, it is possible obtain the polarization rotator in which, after the first waveguide guides linearly polarized light from a first end face to a second end face of the first waveguide and to the polarization rotating unit without rotating the plane of polarization, the polarization rotating unit guides the linearly polarized light from the first end face to the second end face of the polarization rotating unit while rotating the plane of polarization.

The method according to the aspect of the present invention preferably further includes the step of forming a second waveguide on the semiconductor substrate, the second waveguide including a third semiconductor core and a third semiconductor cladding, the second waveguide being disposed adjacent to a second end face of the polarization rotating unit in the first direction and optically coupled to the polarization rotating unit, the third semiconductor core extending in the first direction and also extending in the third direction in a cross section perpendicular to the first direction, the third semiconductor cladding surrounding the third semiconductor core.

The direction of the slow axis of the second waveguide differs from the direction of the slow axis of the polarization rotating unit, as viewed in the first direction. Therefore, the second waveguide and the polarization rotating unit differ in polarization-plane rotation characteristics for the same polarization. Thus, with the method according to the aspect of the present invention, it is possible obtain the polarization rotator in which, after the polarization rotating unit guides linearly polarized light from the first end face to the second end face of the polarization rotating unit and to the second waveguide while rotating the plane of polarization, the second waveguide guides the linearly polarized light from a first end face to a second end face of the second waveguide without rotating the plane of polarization.

In the method according to the aspect of the present invention, the second direction and the third direction preferably form an angle of about 45 degrees. Thus, when only the first waveguide or both the first waveguide and the second waveguide guide linearly polarized light without rotating the plane of polarization, it is possible to achieve a particularly high rotation efficiency of the plane of polarization in the polarization rotating unit.

A polarization rotator according to another aspect of the present invention includes a semiconductor substrate having a main surface, and a polarization rotating unit including a first semiconductor core and a first semiconductor cladding and disposed on the main surface of the semiconductor substrate. The first semiconductor core extends in a first direction parallel to the main surface of the semiconductor substrate. The first semiconductor cladding surrounds the first semiconductor core. A cross section of the first semiconductor core perpendicular to the first direction extends in a second direction that forms an acute angle with the main surface of the semiconductor substrate.

In the polarization rotator according to the aspect of the present invention, the first semiconductor core and the first semiconductor cladding are made of semiconductor materials. Additionally, in the polarization rotator according to the aspect of the present invention, the cross section of the first semiconductor core perpendicular to the first direction extends in the second direction that forms an acute angle with the main surface of the semiconductor substrate. Thus, the polarization rotator having the first semiconductor core inclined with respect to the main surface of the semiconductor substrate is obtained.

In the polarization rotator according to the aspect of the present invention, the acute angle formed by the main surface of the semiconductor substrate and the second direction is preferably between 20 degrees and 80 degrees inclusive. When the angle is greater than or equal to 20 degrees, if linearly polarized light having a plane of polarization parallel or perpendicular to the main surface is incident on the polarization rotating unit, it is possible to achieve a sufficiently high rotation efficiency of the plane of polarization in the polarization rotating unit. It is thus possible to reduce the size of the polarization rotator. In the same manner, when the angle is smaller than or equal to 80 degrees, it is possible to achieve a sufficiently high rotation efficiency of the plane of polarization in the polarization rotating unit. It is thus possible to reduce the size of the polarization rotator.

In the polarization rotator according to the aspect of the present invention, the cross section of the first semiconductor core perpendicular to the first direction preferably has a shape in which a length in the second direction is between three times and ten times, inclusive, a width perpendicular to the second direction. If the length of the cross section in the second direction is less than three times the width perpendicular to the second direction, the cross section of the first semiconductor core is nearly square in shape. This causes a small birefringence, that is, a small difference between a refractive index for light in polarization in the second direction and a refractive index for light in polarization perpendicular to the second direction. This results in a low rotation efficiency of the plane of polarization. If the length of the cross section in the second direction is greater than ten times the width perpendicular to the second direction, the optical confinement into the first semiconductor core is weakened. This causes a small birefringence, that is, a small difference between a refractive index for light in polarization in the second direction and a refractive index for light in polarization perpendicular to the second direction. This results in a low rotation efficiency of the plane of polarization. A high rotation efficiency of the plane of polarization can be achieved when the cross section of the first semiconductor core perpendicular to the first direction has a shape in which a length in the second direction is between three times and ten times, inclusive, a width perpendicular to the second direction.

The polarization rotator according to the aspect of the present invention may further include a first waveguide including a second semiconductor core and a second semiconductor cladding, formed on the semiconductor substrate, and disposed adjacent to a first end face of the polarization rotating unit in the first direction to be optically coupled to the polarization rotating unit. The second semiconductor core preferably extends in the first direction, the second semiconductor cladding preferably surrounds the second semiconductor core, and a cross section of the second semiconductor core perpendicular to the first direction preferably extends in a third direction different from the second direction.

The direction of the slow axis of the first waveguide differs from the direction of the slow axis of the polarization rotating unit, as viewed in the first direction. Therefore, the first waveguide and the polarization rotating unit differ in polarization-plane rotation characteristics for polarizations of the same polarization state. In the polarization rotator according to the aspect of the present invention, the first waveguide guides linearly polarized light from a first end face to a second end face of the first waveguide and to the polarization rotating unit without rotating the plane of polarization. Then, the polarization rotating unit guides the linearly polarized light from the first end face to the second end face of the polarization rotating unit while rotating the plane of polarization. Thus, the polarization of the linearly polarized light incident on the polarization rotator is converted by the polarization rotating unit to a different polarization state.

The polarization rotator according to the aspect of the present invention may further include a second waveguide including a third semiconductor core and a third semiconductor cladding, formed on the semiconductor substrate, and disposed adjacent to a second end face of the polarization rotating unit in the first direction to be optically coupled to the polarization rotating unit. The third semiconductor core preferably extends in the first direction, the third semiconductor cladding preferably surrounds the third semiconductor core, and a cross section of the third semiconductor core perpendicular to the first direction preferably extends in the third direction.

The direction of the slow axis of the second waveguide differs from the direction of the slow axis of the polarization rotating unit, as viewed in the first direction. Therefore, the second waveguide and the polarization rotating unit differ in polarization-plane rotation characteristics for the same polarization. Thus, in the polarization rotator according to the aspect of the present invention, after the polarization rotating unit guides linearly polarized light from the first end face to the second end face of the polarization rotating unit and to the second waveguide while rotating the plane of polarization, the second waveguide can guide the linearly polarized light from a first end face to a second end face of the second waveguide without rotating the plane of polarization.

In the polarization rotator according to the aspect of the present invention, the second direction and the third direction preferably form an angle of about 45 degrees. Thus, when only the first waveguide or both the first waveguide and the second waveguide guide linearly polarized light without rotating the plane of polarization, it is possible to achieve a particularly high rotation efficiency of the plane of polarization in the polarization rotating unit.

BRIEF DESCRIPTION OF THE DRAWINGS

FIGS. 10A and 10B are diagrams for explaining the series of steps involved in carrying out the method of the embodiment.

DESCRIPTION OF THE PREFERRED EMBODIMENTS

Figure 1:
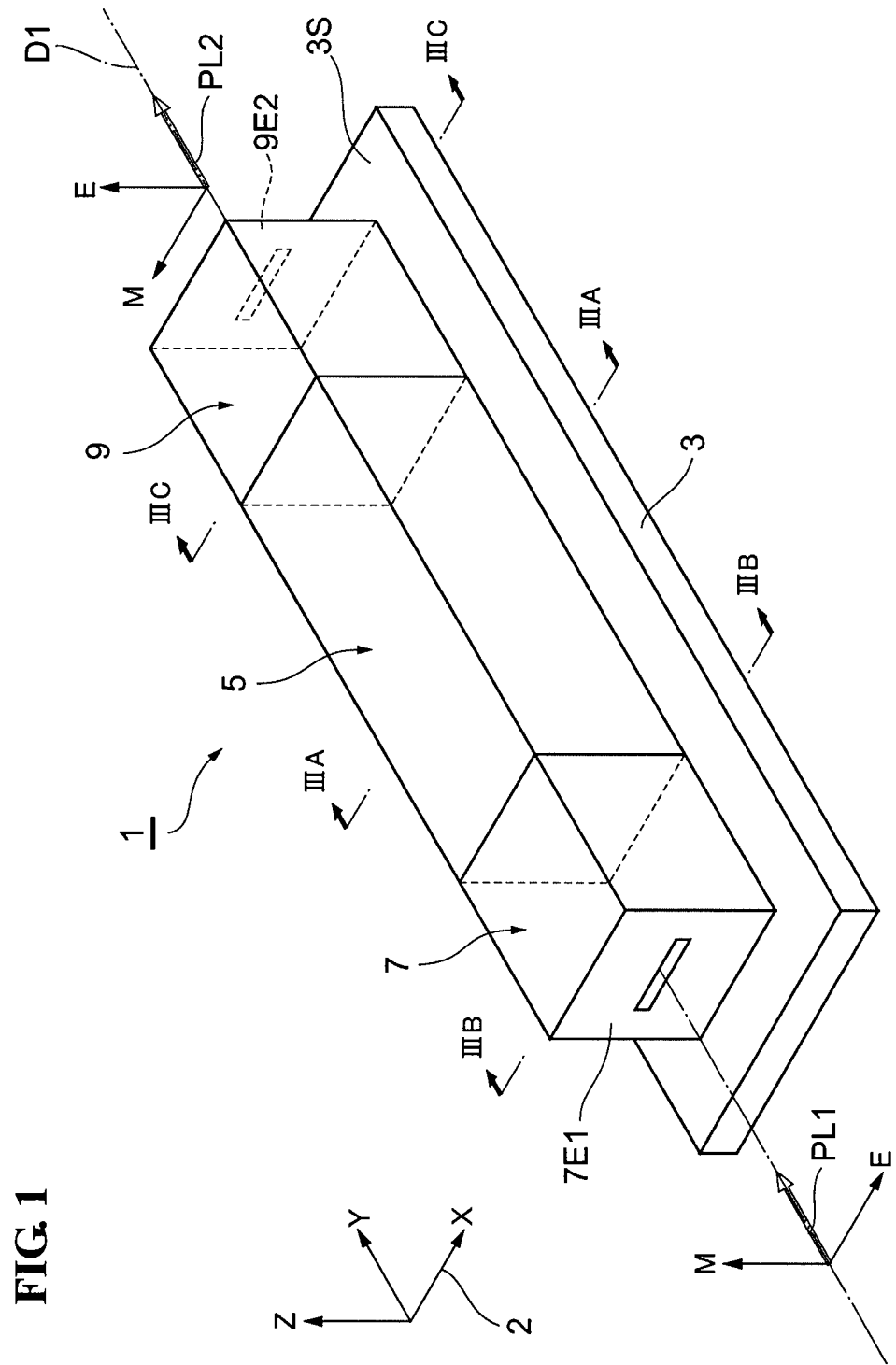
FIG. 1 is a perspective view of a polarization rotator according to an embodiment.

A method for making a polarization rotator and the polarization rotator made thereby according to an embodiment will now be described in detail with reference to the attached drawings. In the drawings, the same elements are assigned the same reference numerals where possible. The dimensional ratios within each component and between components in the drawings are determined appropriately for ease of viewing.

First, a polarization rotator according to the present embodiment will be described. FIG. 1 is a perspective view of a polarization rotator according to the present embodiment.

As illustrated in FIG. 1, a polarization rotator 1 of the present embodiment includes a semiconductor substrate 3 having a main surface 3S, a polarization rotating unit 5, a first waveguide 7, and a second waveguide 9. In the present embodiment, the semiconductor substrate 3 is plate-like in shape, and the main surface 3S of the semiconductor substrate 3 is substantially flat. The polarization rotating unit 5, the first waveguide 7, and the second waveguide 9 are disposed on the main surface 3S of the semiconductor substrate 3.

Figure 2:
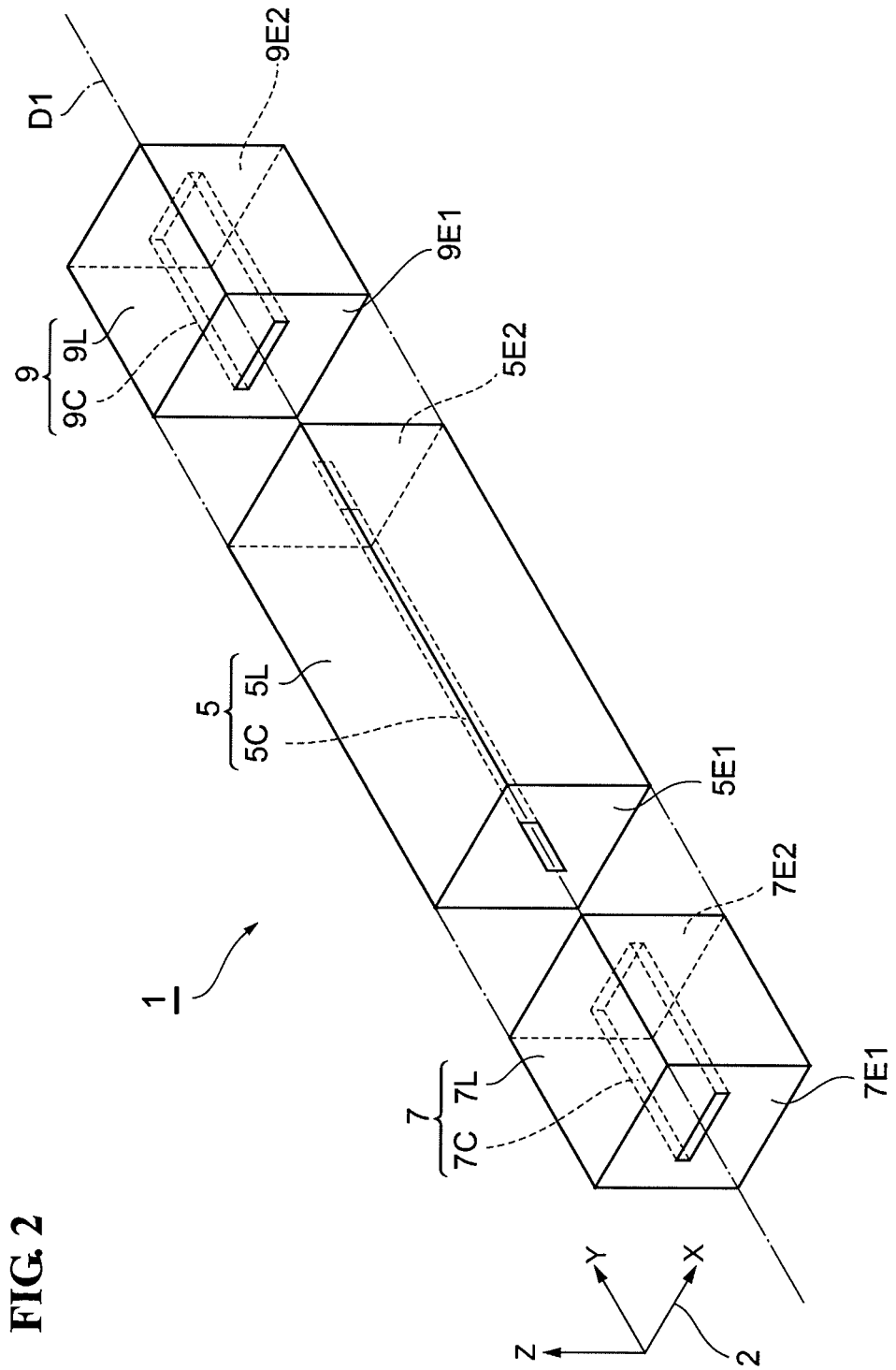
FIG. 2 is an exploded perspective view of the polarization rotator illustrated in FIG. 1.

A rectangular coordinate system 2 is shown in FIG. 1, where the X-axis and the Y-axis are parallel to the main surface 3S of the semiconductor substrate 3. In FIG. 2 and the following figures, the rectangular coordinate system 2 corresponding to FIG. 1 is shown as necessary.

As illustrated in FIG. 1, the polarization rotating unit 5, the first waveguide 7, and the second waveguide 9 extend in a first direction D1 parallel to the Y-axis. In other words, the polarization rotating unit 5, the first waveguide 7, and the second waveguide 9 extend in the first direction D1 parallel to the main surface 3S of the semiconductor substrate 3.

The semiconductor substrate 3 is made of a single-element semiconductor material such as silicon (Si) or germanium (Ge), or of a compound semiconductor material such as a III-V group compound semiconductor. Examples of the III-V group compound semiconductor forming the semiconductor substrate 3 include indium phosphide (InP) and gallium arsenide (GaAs).

FIG. 2 is an exploded perspective view of the polarization rotator 1 illustrated in FIG. 1. In the polarization rotator 1 illustrated in FIG. 2, the polarization rotating unit 5, the first waveguide 7, and the second waveguide 9 are spaced from one another in the first direction D1. Note that the semiconductor substrate 3 is omitted in FIG. 2.

As illustrated in FIG. 2, the polarization rotating unit 5 includes a first semiconductor core 5C and a first semiconductor cladding 5L that extend in the first direction D1. The first semiconductor core 5C extends from a first end face 5E1 of the polarization rotating unit 5 in the first direction D1 to a second end face 5E2 of the polarization rotating unit 5 in the first direction D1. The first end face 5E1 and the second end face 5E2 are flat surfaces substantially orthogonal to the first direction D1. The first semiconductor cladding 5L surrounds the first semiconductor core 5C. That is, in a cross section perpendicular to the first direction D1, the first semiconductor core 5C is surrounded by the first semiconductor cladding 5L.

The first semiconductor core 5C is made of a semiconductor material having a higher refractive index than that of a semiconductor material forming the first semiconductor cladding 5L. A length of the polarization rotating unit 5 in the first direction D1 is, for example, between 20 μm and 500 μm inclusive.

As illustrated in FIG. 2, the first waveguide 7 includes a second semiconductor core 7C and a second semiconductor cladding 7L that extend in the first direction D1. The second semiconductor core 7C extends from a first end face 7E1 of the first waveguide 7 in the first direction D1 to a second end face 7E2 of the first waveguide 7 in the first direction D1. The first end face 7E1 and the second end face 7E2 are flat surfaces substantially orthogonal to the first direction D1. The second semiconductor cladding 7L surrounds the second semiconductor core 7C. That is, in a cross section perpendicular to the first direction D1, the second semiconductor core 7C is surrounded by the second semiconductor cladding 7L. The second end face 7E2 of the first waveguide 7 is disposed adjacent to the first end face 5E1 of the polarization rotating unit 5 such that the first waveguide 7 is optically coupled to the polarization rotating unit 5.

The second semiconductor core 7C is made of a semiconductor material having a higher refractive index than that of a semiconductor material forming the second semiconductor cladding 7L. A length of the first waveguide 7 in the first direction D1 is, for example, 100 μm.

In the present embodiment, the second waveguide 9 has the same configuration as that of the first waveguide 7. That is, as illustrated in FIG. 2, the second waveguide 9 includes a third semiconductor core 9C and a third semiconductor cladding 9L that extend in the first direction D1. The third semiconductor core 9C extends from a first end face 9E1 of the second waveguide 9 in the first direction D1 to a second end face 9E2 of the second waveguide 9 in the first direction D1. The first end face 9E1 and the second end face 9E2 are flat surfaces substantially orthogonal to the first direction D1. The third semiconductor cladding 9L surrounds the third semiconductor core 9C. That is, in a cross section perpendicular to the first direction D1, the third semiconductor core 9C is surrounded by the third semiconductor cladding 9L. The first end face 9E1 of the second waveguide 9 is disposed adjacent to the second end face 5E2 of the polarization rotating unit 5 such that the second waveguide 9 is optically coupled to the polarization rotating unit 5.

The third semiconductor core 9C is made of a semiconductor material having a higher refractive index than that of a semiconductor material forming the third semiconductor cladding 9L. A length of the second waveguide 9 in the first direction D1 is, for example, 100 μm.

Next, cross-sectional shapes of the polarization rotating unit 5, the first waveguide 7, and the second waveguide 9 will be described.

Figure 3A:
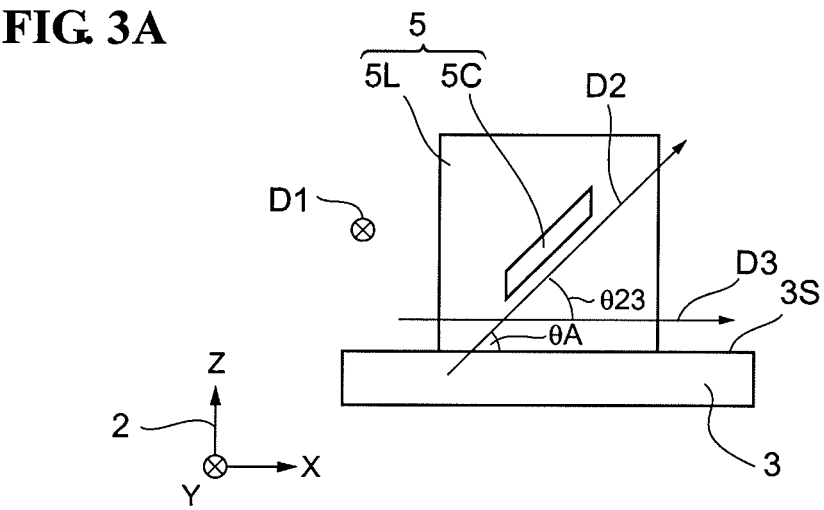
FIG. 3A is a cross-sectional view taken along line IIIA-IIIA of the polarization rotator illustrated in FIG. 1.
Figure 3B:
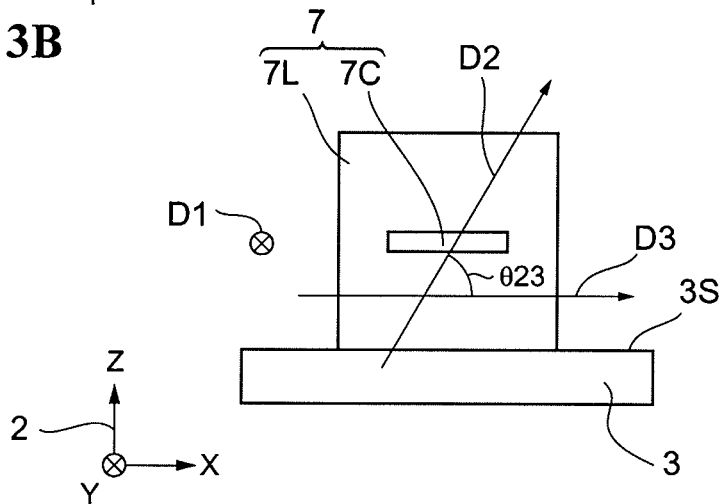
FIG. 3B is a cross-sectional view taken along line IIIB-IIIB of the polarization rotator illustrated in FIG. 1.
Figure 3C:
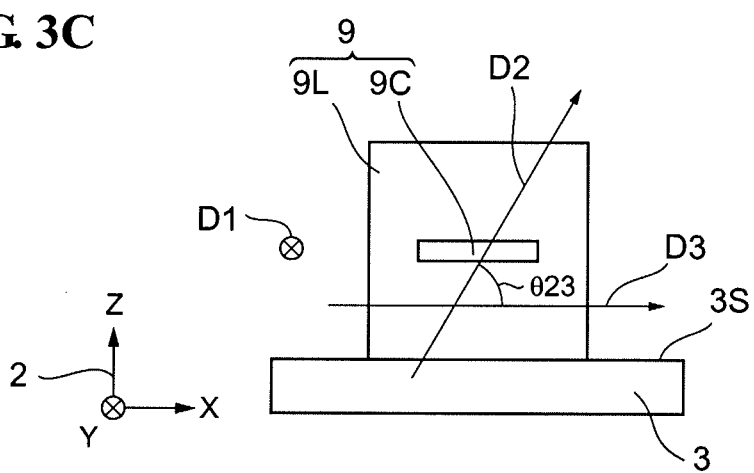
FIG. 3C is a cross-sectional view taken along line IIIC-IIIC of the polarization rotator illustrated in FIG. 1.

FIG. 3A is a cross-sectional view taken along line IIIA-IIIA of the polarization rotator 1 illustrated in FIG. 1. FIG. 3B is a cross-sectional view taken along line IIIB-IIIB of the polarization rotator 1 illustrated in FIG. 1. FIG. 3C is a cross-sectional view taken along line IIIC-IIIC of the polarization rotator 1 illustrated in FIG. 1.

As illustrated in FIG. 3A, a cross section of the first semiconductor core 5C perpendicular to the first direction D1 extends in a second direction D2 that forms an acute angle θA with the main surface 3S of the semiconductor substrate 3. The cross section of the first semiconductor core 5C perpendicular to the first direction D1 has a shape in which a length in the second direction D2 is greater than a width perpendicular to the second direction D2. For reasons to be described below, the acute angle θA is preferably between 20 degrees and 80 degrees inclusive. More preferably, the acute angle θA is about 45 degrees.

The cross section of the first semiconductor core 5C perpendicular to the first direction D1 is, for example, rectangular, parallelogrammatic, or trapezoidal in shape. The cross section of the first semiconductor core 5C perpendicular to the first direction D1 has a length of, for example, between 1 μm and 5 μm, inclusive, in the second direction D2. The cross section of the first semiconductor core 5C perpendicular to the first direction D1 has a width of, for example, between 0.1 μm and 0.5 μm, inclusive, in a direction perpendicular to the second direction D2.

A cross section of the first semiconductor cladding 5L perpendicular to the first direction D1 is, for example, square, rectangular, parallelogrammatic, or trapezoidal in shape. The first semiconductor cladding 5L may be formed across the width of the semiconductor substrate 3 in the X-axis direction.

The first semiconductor core 5C is made of a single-element semiconductor material or a compound semiconductor material. Examples of the compound semiconductor material forming the first semiconductor core 5C include III-V group compound semiconductors, such as gallium indium arsenide phosphide (GaInAsP) and GaAs. The first semiconductor cladding 5L is made of a single-element semiconductor material or a compound semiconductor material. Examples of the compound semiconductor material forming the first semiconductor cladding 5L include III-V group compound semiconductors, such as InP and aluminum gallium arsenide (AlGaAs).

As illustrated in FIG. 3B, a cross section of the second semiconductor core 7C perpendicular to the first direction D1 extends in a third direction D3, which differs from the second direction D2. That is, the second direction D2 and the third direction D3 form an angle θ23 greater than 0 degrees. The cross section of the second semiconductor core 7C perpendicular to the first direction D1 has a shape in which a length in the third direction D3 is greater than a width perpendicular to the third direction D3. In the present embodiment, the third direction D3 is parallel to the main surface 3S of the semiconductor substrate 3. That is, in the present embodiment, the third direction D3 is parallel to the X-axis. To improve efficiency of optical coupling between the first waveguide 7 and the polarization rotating unit 5, it is preferable that the second semiconductor core 7C partially overlap with the first semiconductor core 5C, as viewed in the first direction D1 (see FIGS. 1 and 2).

The cross section of the second semiconductor core 7C perpendicular to the first direction D1 is, for example, rectangular, parallelogrammatic, or trapezoidal in shape. The cross section of the second semiconductor core 7C perpendicular to the first direction D1 has a length of, for example, between 1 μm and 5 μm, inclusive, in the third direction D3. The cross section of the second semiconductor core 7C perpendicular to the first direction D1 has a width of, for example, between 0.1 μm and 0.5 μm, inclusive, in a direction perpendicular to the third direction D3.

A cross section of the second semiconductor cladding 7L perpendicular to the first direction D1 is, for example, square, rectangular, parallelogrammatic, or trapezoidal in shape. The second semiconductor cladding 7L may be formed across the width of the semiconductor substrate 3 in the X-axis direction. In the present embodiment, the cross section of the second semiconductor cladding 7L perpendicular to the first direction D1 has substantially the same shape as that of the cross section of the first semiconductor cladding 5L perpendicular to the first direction D1.

The second semiconductor core 7C is made of a single-element semiconductor material or a compound semiconductor material. Examples of the compound semiconductor material forming the second semiconductor core 7C include III-V group compound semiconductors, such as GaInAsP and GaAs. The second semiconductor cladding 7L is made of a single-element semiconductor material or a compound semiconductor material. Examples of the compound semiconductor material forming the second semiconductor cladding 7L include III-V group compound semiconductors, such as InP and AlGaAs.

As illustrated in FIG. 3C, a cross section of the third semiconductor core 9C perpendicular to the first direction D1 extends in the third direction D3. The cross section of the third semiconductor core 9C perpendicular to the first direction D1 has a shape in which a length in the third direction D3 is greater than a width perpendicular to the third direction D3. To improve efficiency of optical coupling between the second waveguide 9 and the polarization rotating unit 5, it is preferable that the third semiconductor core 9C partially overlap with the first semiconductor core 5C, as viewed in the first direction D1 (see FIGS. 1 and 2).

The cross section of the third semiconductor core 9C perpendicular to the first direction D1 is, for example, rectangular, parallelogrammatic, or trapezoidal in shape. The cross section of the third semiconductor core 9C perpendicular to the first direction D1 has a length of, for example, between 1 μm and 5 μm, inclusive, in the third direction D3. The cross section of the third semiconductor core 9C perpendicular to the first direction D1 has a width of, for example, between 0.1 μm and 0.5 μm, inclusive, in a direction perpendicular to the third direction D3.

A cross section of the third semiconductor cladding 9L perpendicular to the first direction D1 is, for example, square, rectangular, parallelogrammatic, or trapezoidal in shape. The semiconductor cladding 9L may be formed across the width of the semiconductor substrate 3 in the X-axis direction. In the present embodiment, the cross section of the third semiconductor cladding 9L perpendicular to the first direction D1 has substantially the same shape as that of the cross section of the first semiconductor cladding 5L perpendicular to the first direction D1.

The third semiconductor core 9C is made of a single-element semiconductor material or a compound semiconductor material. Examples of the compound semiconductor material forming the third semiconductor core 9C include III-V group compound semiconductors, such as GaInAsP and GaAs. The third semiconductor cladding 9L is made of a single-element semiconductor material or a compound semiconductor material. Examples of the compound semiconductor material forming the third semiconductor cladding 9L include III-V group compound semiconductors, such as InP and AlGaAs.

The function of the polarization rotator 1 of the present embodiment will now be described with reference to FIGS. 1 to 3C.

First, the function of the polarization rotating unit 5 will be described. As illustrated in FIG. 3A, in the cross section perpendicular to the first direction D1, the first semiconductor core 5C of the polarization rotating unit 5 extends in the second direction D2. As described above, the refractive index of the semiconductor material forming the first semiconductor core 5C is higher than that of the semiconductor material forming the first semiconductor cladding 5L.

Therefore, when polarized light is guided in the polarization rotating unit 5 in the first direction D1, the effective refractive index of the polarization rotating unit 5 for the polarized light is dependent on the direction of the plane of polarization of the polarized light (i.e., the direction of the electric field vector). Specifically, the polarization rotating unit 5 exhibits the highest effective refractive index for polarized light having a plane of polarization in the second direction D2. On the other hand, the polarization rotating unit 5 exhibits the lowest effective refractive index for polarized light having a plane of polarization perpendicular to the second direction D2. Generally, a birefringent element has different refractive indices for light that propagates therethrough along the slow axis and the fast axis. A direction axis parallel to the direction of polarization in which refractive index is minimum is defined as a fast axis. Conversely, a direction axis parallel to the direction of polarization in which refractive index is maximum is defined as a slow axis. The polarization rotating unit 5 functions as a birefringent element which has a slow axis parallel to the second direction D2 and a fast axis perpendicular to both the first direction D1 and the second direction D2.

For example, when linear polarization having a plane of polarization that forms an acute angle with the second direction D2 is guided in the polarization rotating unit 5 in the first direction D1, the plane of linear polarization is rotated. When the plane of linear polarization forms an angle of 45 degrees with the second direction D2, the rotation efficiency of the plane of linear polarization in the polarization rotating unit 5 is highest. Here, the rotation efficiency of the plane of linear polarization in the polarization rotating unit 5 refers to an angle of rotation of the plane of linear polarization in the polarization rotating unit 5 per unit length in the first direction D1. When linear polarization having a plane of polarization that is parallel to, or that forms an angle of 90 degrees with, the second direction D2 is guided in the polarization rotating unit 5 in the first direction D1, the plane of linear polarization does not change.

The function of the first waveguide 7 and second waveguide 9 will now be described. As illustrated in FIGS. 3B and 3C, in the cross sections perpendicular to the first direction D1, the second semiconductor core 7C of the first waveguide 7 and the third semiconductor core 9C of the second waveguide 9 extend in the third direction D3. As described above, the refractive index of the semiconductor material forming the second semiconductor core 7C is higher than that of the semiconductor material forming the second semiconductor cladding 7L. Also, the refractive index of the semiconductor material forming the third semiconductor core 9C is higher than that of the semiconductor material forming the third semiconductor cladding 9L.

Therefore, when polarized light is guided in the first waveguide 7 and the second waveguide 9 in the first direction D1, the effective refractive index of each of the first waveguide 7 and the second waveguide 9 for the polarized light is dependent on the direction of the plane of polarization of the polarized light (i.e., the direction of the electric field vector). Specifically, the first waveguide 7 and the second waveguide 9 each exhibit the highest effective refractive index for polarized light having a plane of polarization in the third direction D3. On the other hand, the first waveguide 7 and the second waveguide 9 each exhibit the lowest effective refractive index for polarized light having a plane of polarization perpendicular to the third direction D3. The first waveguide 7 and the second waveguide 9 each function as a birefringent element which has a slow axis parallel to the third direction D3 and a fast axis perpendicular to both the first direction D1 and the third direction D3.

For example, when linear polarization having a plane of polarization that forms an acute angle with the third direction D3 is guided in the first waveguide 7 or the second waveguide 9 in the first direction D1, the plane of linear polarization is rotated by the first waveguide 7 or the second waveguide 9. When the plane of linear polarization forms an angle of 45 degrees with the third direction D3, the rotation efficiency of the plane of linear polarization in the first waveguide 7 or the second waveguide 9 is highest. Here, the rotation efficiency of the plane of linear polarization in the first waveguide 7 or the second waveguide 9 refers to an angle of rotation of the plane of linear polarization in the first waveguide 7 or the second waveguide 9 per unit length in the first direction D1. When linear polarization having a plane of polarization that is parallel to, or that forms an angle of 90 degrees with, the third direction D3 (i.e., in the present embodiment, linear polarization having a plane of polarization parallel to the X-axis or the Z-axis) is guided in the first waveguide 7 or the second waveguide 9 in the first direction D1, the plane of linear polarization does not change.

The overall function of the polarization rotator 1 will now be described. As illustrated in FIGS. 1 and 2, the polarization rotator 1 allows polarized light incident on the first end face 7E1 of the first waveguide 7 to be guided in the first waveguide 7, the polarization rotating unit 5, and the second waveguide 9 in this order in the first direction D1 and to be emitted from the second end face 9E2 of the second waveguide 9. When the polarized light is guided in the first waveguide 7, the polarization rotating unit 5, and the second waveguide 9 on the basis of the above-described functions of the polarization rotating unit 5, the first waveguide 7, and the second waveguide 9, the polarization rotator 1 can rotate the plane of polarization of the polarized light in some or all of the first waveguide 7, the polarization rotating unit 5, and the second waveguide 9. Thus, the polarization rotator 1 functions as a wave plate.

A description will be given of the case where, for example, the polarization rotator 1 functions as a half-wavelength plate (half-wave plate). Here, as illustrated in FIG. 1, TE polarization PL1, which is linear polarization, is incident on the polarization rotator 1.

In this case, the polarization rotator 1 rotates, by 90 degrees, the plane of the TE polarization PL1 incident on the first end face 7E1 of the first waveguide 7. Thus, the polarization rotator 1 converts the TE polarization PL1 to TM polarization PL2 and emits light in the TM polarization PL2 from the second end face 9E2 of the second waveguide 9. The TM polarization PL2 is also linear polarization. An electric field E of the TE polarization PL1 is orthogonal to a plane of incidence parallel to the YZ plane, and a magnetic field M of the TM polarization PL2 is orthogonal to the plane of incidence. Therefore, a component of the electric field E of the TE polarization PL1 perpendicular to the first direction D1 is parallel to the X-axis, and a component of the electric field E of the TM polarization PL2 perpendicular to the first direction D1 is parallel to the Z-axis.

Rotation of a plane of polarization by the polarization rotator 1 will now be specifically described. As described above, the first waveguide 7 does not rotate the plane of linear polarization parallel to the X-axis. Therefore, in the present embodiment, while maintaining the polarization state, the first waveguide 7 guides the TE polarization PL1 from the first end face 7E1 to the second end face 7E2 and emits it from the second end face 7E2.

Next, light in the TE polarization PL1 is incident on the first end face 5E1 of the polarization rotating unit 5. As described above, the polarization rotating unit 5 rotates the plane of linear polarization that forms an acute angle with the second direction D2. Therefore, in the present embodiment, while rotating the plane of polarization, the polarization rotating unit 5 guides light in the TE polarization PL1 from the first end face 5E1 to the second end face 5E2 and emits light in the TM polarization PL2 from the second end face 5E2.

Next, light in the TM polarization PL2 is incident on the first end face 9E1 of the second waveguide 9. As described above, the second waveguide 9 does not rotate the plane of linear polarization parallel to the Z-axis. Therefore, in the present embodiment, while maintaining the polarization state, the second waveguide 9 guides light in the TM polarization PL2 from the first end face 9E1 to the second end face 9E2 and emits it from the second end face 9E2.

Thus, the polarization rotator 1 rotates the plane of polarization of polarized light incident thereon, converts the polarized light to polarized light of different polarization state, and emits the resulting polarized light.

In the polarization rotator 1 of the present embodiment illustrated in FIGS. 1 to 3C, the first semiconductor core 5C and the first semiconductor cladding 5L are made of semiconductor materials. Therefore, elements of the polarization rotator 1 and other semiconductor devices can be easily monolithically integrated on the main surface 3S of the semiconductor substrate 3.

Additionally, in the polarization rotator 1 of the present embodiment, the cross section of the first semiconductor core 5C perpendicular to the first direction D1 extends in the second direction D2 that forms the acute angle θA with the main surface 3S of the semiconductor substrate 3 (see FIG. 3A). Thus, the polarization rotator 1 having the first semiconductor core 5C inclined with respect to the main surface 3S of the semiconductor substrate 3 is obtained.

Also, in the polarization rotator 1 of the present embodiment, an angle formed by the main surface 3S of the semiconductor substrate 3 and the second direction D2 (i.e., the acute angle θA) is preferably between 20 degrees and 80 degrees inclusive. Now, linearly polarized light having a plane of polarization parallel to the main surface 3S (e.g., the TE polarization PL1) or linearly polarized light having a plane of polarization perpendicular to the main surface 3S is incident on the polarization rotating unit 5. When the acute angle θA is greater than or equal to 20 degrees, it is possible to achieve a sufficiently high rotation efficiency of the plane of polarization in the polarization rotating unit 5 (see FIGS. 1 and 3A). Thus, since the length of the polarization rotating unit 5 in the first direction D1 can be reduced, the size of the polarization rotator 1 can be reduced.

In the same manner, when the acute angle θA is smaller than or equal to 80 degrees, it is possible to achieve a sufficiently high rotation efficiency of the plane of polarization in the polarization rotating unit 5 (see FIGS. 1 and 3A).

The polarization rotator 1 of the present embodiment includes the first waveguide 7 which is disposed adjacent to the first end face 5E1 of the polarization rotating unit 5 in the first direction D1 such that the first waveguide 7 is optically coupled to the polarization rotating unit 5. The first waveguide 7 is disposed on the semiconductor substrate 3 and includes the second semiconductor core 7C of semiconductor material and the second semiconductor cladding 7L of semiconductor material. The second semiconductor core 7C extends in the first direction D1, and the second semiconductor cladding 7L surrounds the second semiconductor core 7C. The cross section of the second semiconductor core 7C perpendicular to the first direction D1 extends in the third direction D3 different from the second direction D2 (see FIGS. 1, 2, and 3B).

The direction of the slow axis of the first waveguide 7 (i.e., the direction parallel to the third direction D3) differs from the direction of the slow axis of the polarization rotating unit 5 (i.e., the direction parallel to the second direction D2), as viewed in the first direction D1 (see FIGS. 3A and 3B). Therefore, the first waveguide 7 and the polarization rotating unit 5 differ in polarization-plane rotation characteristics for polarizations of the same polarization state. In the polarization rotator 1 of the present embodiment, the first waveguide 7 guides linearly polarized light from the first end face 7E1 to the second end face 7E2 and to the polarization rotating unit 5 without rotating the plane of polarization. Then, the polarization rotating unit 5 guides the linearly polarized light from the first end face 5E1 to the second end face 5E2 while rotating the plane of polarization, and thereby converts the linear polarization to polarization of different polarization state.

Specifically, for example, as described above, the first waveguide 7 guides light in the TE polarization PL1 from the first end face 7E1 to the second end face 7E2 and to the polarization rotating unit 5 without rotating the plane of polarization. Then, the polarization rotating unit 5 guides light in the TE polarization PL1 from the first end face 5E1 to the second end face 5E2 while rotating the plane of polarization, and thereby converts the TE polarization PL1 to the TM polarization PL2.

The polarization rotator 1 of the present embodiment further includes the second waveguide 9 which is disposed adjacent to the second end face 5E2 of the polarization rotating unit 5 in the first direction D1 such that the second waveguide 9 is optically coupled to the polarization rotating unit 5. The second waveguide 9 is disposed on the semiconductor substrate 3 and includes the third semiconductor core 9C of semiconductor material and the third semiconductor cladding 9L of semiconductor material. The third semiconductor core 9C extends in the first direction D1, and third semiconductor cladding 9L surrounds the third semiconductor core 9C. The cross section of the third semiconductor core 9C perpendicular to the first direction D1 extends in the third direction D3 (see FIGS. 1, 2, and 3C).

The direction of the slow axis of the second waveguide 9 (i.e., the direction parallel to the third direction D3) differs from the direction of the slow axis of the polarization rotating unit 5 (i.e., the direction parallel to the second direction D2), as viewed in the first direction D1 (see FIGS. 3A and 3C). Therefore, the second waveguide 9 and the polarization rotating unit 5 differ in polarization-plane rotation characteristics for polarizations of the same polarization state. In the polarization rotator 1 of the present embodiment, the polarization rotating unit 5 guides linearly polarized light from the first end face 5E1 to the second end face 5E2 and to the second waveguide 9 while rotating the plane of polarization. Then, the second waveguide 9 guides light in the linear polarization from the first end face 9E1 to the second end face 9E2 without rotating the plane of polarization.

Specifically, for example, as described above, the polarization rotating unit 5 guides light in the TE polarization PL1 from the first end face 5E1 to the second end face 5E2 while rotating the plane of polarization, and thereby converts the TE polarization PL1 to the TM polarization PL2. Then, the polarization rotating unit 5 guides light in the TM polarization PL2 to the second waveguide 9. The second waveguide 9 guides light in the TM polarization PL2 from the first end face 9E1 to the second end face 9E2 without rotating the plane of polarization.

In the polarization rotator 1 of the present embodiment, the second direction D2 and the third direction D3 preferably form an angle of about 45 degrees. That is, the angle θ23 formed by the second direction D2 and the third direction D3 is preferably about 45 degrees (see FIG. 3A). Thus, when the first waveguide 7 and the second waveguide 9 guide linearly polarized light without rotating the plane of polarization, the angle formed by the plane of linear polarization and the slow axis of the polarization rotating unit 5 is about 45 degrees. A particularly high rotation efficiency of the plane of polarization in the polarization rotating unit 5 can thus be achieved.

Also, in the polarization rotator 1 of the present embodiment, the cross section of the first semiconductor core 5C perpendicular to the first direction D1 preferably has a shape in which a length in the second direction D2 is between three times and ten times, inclusive, a width perpendicular to the second direction D2 (see FIG. 3A). If the length of the cross section in the second direction D2 is less than three times the width perpendicular to the second direction D2, the cross section of the first semiconductor core 5C is nearly square in shape. This causes a small birefringence, that is, a small difference between a refractive index for polarization in the second direction D2 and a refractive index for polarization perpendicular to the second direction D2. This results in a low rotation efficiency of the plane of polarization. If the length of the cross section in the second direction D2 is greater than ten times the width perpendicular to the second direction D2, the optical confinement into the first semiconductor core 5C is weakened. This causes a small birefringence, that is, a small difference between a refractive index for polarization in the second direction D2 and a refractive index for polarization perpendicular to the second direction D2. This results in a low rotation efficiency of the plane of polarization. A high rotation efficiency of the plane of polarization can be achieved when the cross section of the first semiconductor core 5C perpendicular to the first direction D1 has a shape in which a length in the second direction D2 is between three times and ten times, inclusive, a width perpendicular to the second direction D2.

Characteristics of a polarization rotating unit and a waveguide of a polarization rotator will now be described. First, characteristics of a waveguide A having a configuration corresponding to the first waveguide 7 (or second waveguide 9) of the above-described embodiment were evaluated. The waveguide A meets the following conditions.

A semiconductor material forming the second semiconductor core 7C (or third semiconductor core 9C) of the waveguide A is GaInAsP. A semiconductor material forming the second semiconductor cladding 7L (or third semiconductor cladding 9L) of the waveguide A is InP. The refractive indices of GaInAsP and InP for light having a wavelength of 1.55 μm are about 3.401 and about 3.169, respectively. The second semiconductor core 7C (or third semiconductor core 9C) of the waveguide A extends in the third direction D3 (see FIGS. 3B and 3C), which is parallel to the X-axis (i.e., parallel to the main surface 3S of the semiconductor substrate 3). A cross section of the second semiconductor core 7C (or third semiconductor core 9C) of the waveguide A perpendicular to the first direction D1 has a length of 1.5 μM in the third direction D3, and has a width of 0.3 μm in a direction perpendicular to the third direction D3.

For the waveguide A described above, an effective refractive index was calculated, using a beam propagation method (BPM), for each of four types of linearly polarized light guided in the waveguide A in the first direction D1. The four types of linearly polarized lights have a wavelength of 1.55 μm and differ in polarization state. The four types of linearly polarized lights include: linear polarization having a plane of polarization parallel to the X-axis (TE polarization), linear polarization having a plane of polarization parallel to the Z-axis (TM polarization), linear polarization having a plane of polarization forming an angle of 45 degrees with the X-axis (hereinafter referred to as "45-degree polarization"), and linear polarization having a plane of polarization forming an angle of 135 degrees with the X-axis (hereinafter referred to as "135-degree polarization").

The calculation showed that the effective refractive index of the waveguide A for light in the TE polarization was 3.2318, the effective refractive index of the waveguide A for light in the TM polarization was 3.2229, and the effective refractive index of the waveguide A for light in the 45-degree polarization and the effective refractive index of the waveguide A for light in the 135-degree polarization were both 3.2274. It was found that the effective refractive index of the waveguide A for light in the 45-degree polarization and the effective refractive index of the waveguide A for light in the 135-degree polarization were equal. This indicates that when light in the TE polarization or the TM polarization is guided in the waveguide A in the first direction D1, the waveguide A does not rotate the plane of polarization of the TE polarization or the TM polarization.

Next, characteristics of a polarization rotating unit A having a configuration corresponding to the polarization rotating unit 5 of the above-described embodiment were evaluated. The polarization rotating unit A meets the following conditions.

A semiconductor material forming the first semiconductor core 5C of the polarization rotating unit A is GaInAsP. A semiconductor material forming the first semiconductor cladding 5L of the polarization rotating unit A is InP. The refractive indices of GaInAsP and InP for light having a wavelength of 1.55 μm are about 3.401 and about 3.169, respectively. The first semiconductor core 5C of the polarization rotating unit A extends in the second direction D2 (see FIG. 3A). Here, the acute angle θA formed by the second direction D2 and the main surface 3S of the semiconductor substrate 3 is 45 degrees. A cross section of the first semiconductor core 5C of the polarization rotating unit A perpendicular to the first direction D1 has a length of 1.8 μm in the second direction D2, and has a width of 0.3 μm in a direction perpendicular to the second direction D2.

For the polarization rotating unit A described above, an effective refractive index was calculated, using the BPM, for each of two types of linearly polarized lights (light in 45-degree polarization and light in 135-degree polarization) guided in the polarization rotating unit A in the first direction D1. The two types of linearly polarized lights have a wavelength of 1.55 μm and differ in polarization state. The plane of polarization of the 45-degree polarization is parallel to the second direction D2, and the plane of polarization of the 135-degree polarization is orthogonal to the second direction D2.

The calculation showed that the effective refractive index of the polarization rotating unit A for light in the 45-degree polarization was 3.2284 and the effective refractive index of the polarization rotating unit A for light in the 135-degree polarization was 3.2197. It was found that the effective refractive index of the polarization rotating unit A for light in the 45-degree polarization and the effective refractive index of the polarization rotating unit A for light in the 135-degree polarization were different. This indicates that when TE-polarized light or TM-polarized light is guided in the polarization rotating unit A in the first direction D1, the polarization rotating unit A rotates the plane of polarization of the TE-polarized light or the TM-polarized light.

Next, characteristics of the waveguide A and the polarization rotating unit A (described above) and polarization rotating units B to I (described below) were evaluated.

The polarization rotating units B to I have the same configuration as that of the polarization rotating unit A, except for the acute angle θA formed by the second direction D2 and the main surface 3S of the semiconductor substrate 3. The acute angles θA formed by the second directions D2 of the polarization rotating units B, C, D, E, F, G, H, and I and the main surface 3S of the semiconductor substrate 3 are 5 degrees, 10 degrees, 25 degrees, 30 degrees, 40 degrees, 50 degrees, 60 degrees, and 65 degrees, respectively.

For the waveguide A and the polarization rotating units A to I described above, an effective refractive index was calculated, using the BPM, for each of two types of linearly polarized lights (light in 45-degree polarization and light in 135-degree polarization) guided in the waveguide A and the polarization rotating units A to I in the first direction D1. The two types of linearly polarized lights have a wavelength of 1.55 μm and differ in polarization state.

Figure 4:
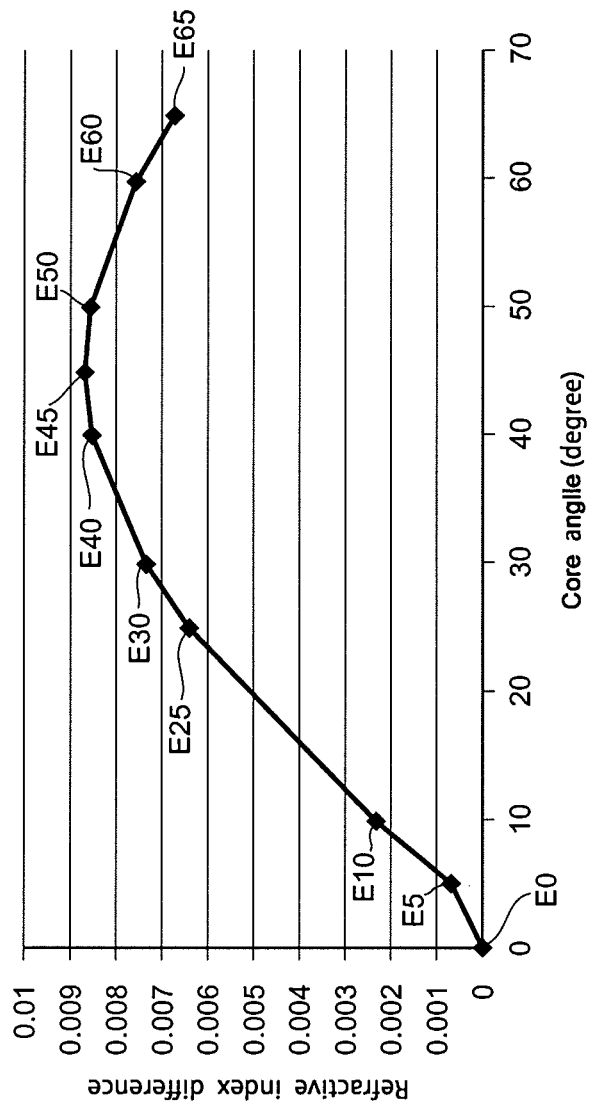
FIG. 4 is a graph illustrating calculated characteristics of a waveguide and polarization rotating units.

FIG. 4 is a graph illustrating calculated characteristics of the waveguide A and the polarization rotating units A to I. The vertical axis of FIG. 4 represents a difference in refractive index, that is, a difference between refractive indices of each of the waveguide A and the polarization rotating units A to I for light in the 45-degree polarization and light in the 135-degree polarization. The horizontal axis of FIG. 4 represents a core angle, that is, an angle formed by the main surface 3S of the semiconductor substrate 3 and a direction (second direction D2) in which the first semiconductor core 5C of the waveguide A extends, or an angle formed by the main surface 3S of the semiconductor substrate 3 and a direction (third direction D3) in which the second semiconductor core 7C or the third semiconductor core 9C of each of the polarization rotating units A to I extends. The core angles of the waveguide A and the polarization rotating units A, B, C, D, E, F, G, H, and I are 0 degrees, 45 degrees, 5 degrees, 10 degrees, 25 degrees, 30 degrees, 40 degrees, 50 degrees, 60 degrees, and 65 degrees, respectively. Points E0, E5, E10, E25, E30, E40, E45, E50, E60, and E65 plotted in FIG. 4 correspond to the waveguide A, the polarization rotating unit B, the polarization rotating unit C, the polarization rotating unit D, the polarization rotating unit E, the polarization rotating unit F, the polarization rotating unit A, the polarization rotating unit G, the polarization rotating unit H, and the polarization rotating unit I, respectively.

As illustrated in FIG. 4, as the core angle approaches 45 degrees, a difference in refractive index increases. The larger the difference in refractive index, the higher the rotation efficiency of the plane of polarization in the polarization rotating unit. That is, the closer the core angle is to 45 degrees, the higher the rotation efficiency of the plane of polarization in the polarization rotating unit.

For the polarization rotating units A to I, a length of each of the polarization rotating units A to I in the first direction D1 was calculated using the BPM, the length being necessary to convert TE polarization of light having a wavelength of 1.55 μm and guided in the polarization rotating unit in the first direction D1 to TM polarization (hereinafter simply referred to as "a necessary length of a polarization rotating unit").

Figure 5:
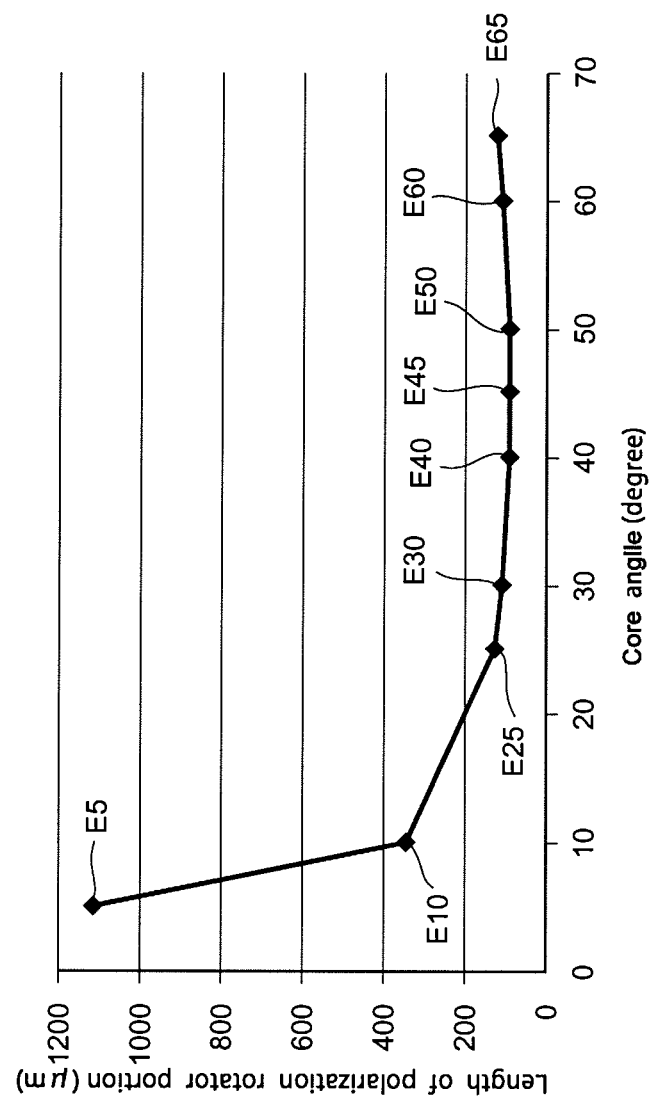
FIG. 5 is a graph illustrating calculations for the polarization rotating units.

FIG. 5 is a graph illustrating calculations for the polarization rotating units A to I. The correspondence between plotted points and the polarization rotating units A to I is the same as that in FIG. 4. The vertical axis of FIG. 5 represents a necessary length of a polarization rotating unit. The horizontal axis of FIG. 5 represents a core angle as in FIG. 4.

As illustrated in FIG. 5, a necessary length of a polarization rotating unit is particularly small when the core angle is 20 degrees or greater. That is, when the core angle is 20 degrees or greater, it is possible to reduce the length of the polarization rotating unit 5 in the first direction D1 and thus to reduce the overall size of the polarization rotator 1.

A method for making a polarization rotator according to the present embodiment will now be described. A method for making the polarization rotator 1 according to the present embodiment includes a structure forming step, a first semiconductor layer forming step, a second semiconductor layer forming step, a third semiconductor layer forming step, a mask forming step, a semiconductor laminate etching step, a fourth semiconductor layer forming step, a first waveguide forming step, and a second waveguide forming step. These steps will be described in detail with reference to FIGS. 6A to 17D. FIGS. 6A to 17D are diagrams for explaining a series of steps involved in carrying out a method for making a polarization rotator according to the present embodiment.

(Structure Forming Step)

Figure 6A:
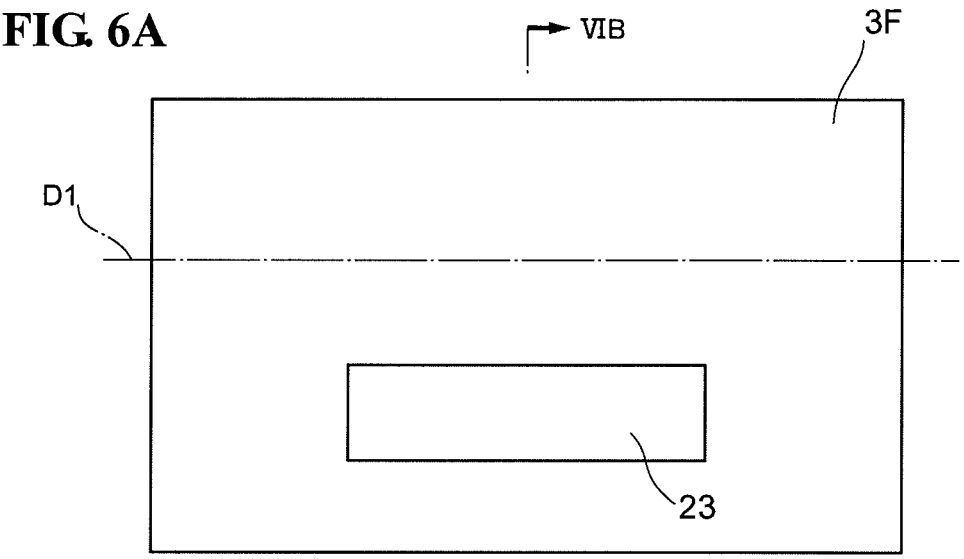
FIGS. 6A and 6B are diagrams for explaining a series of steps involved in carrying out a method for making a polarization rotator according to an embodiment.
Figure 6B:
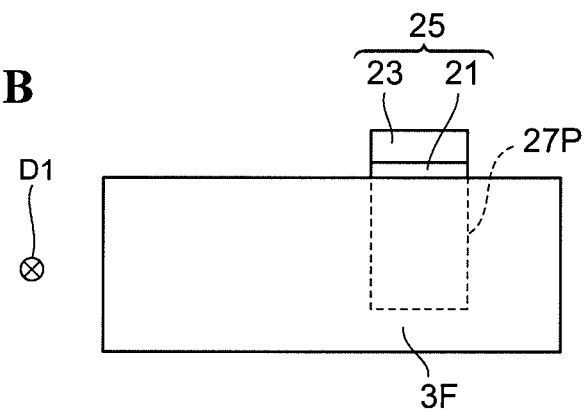
Figure 7A:
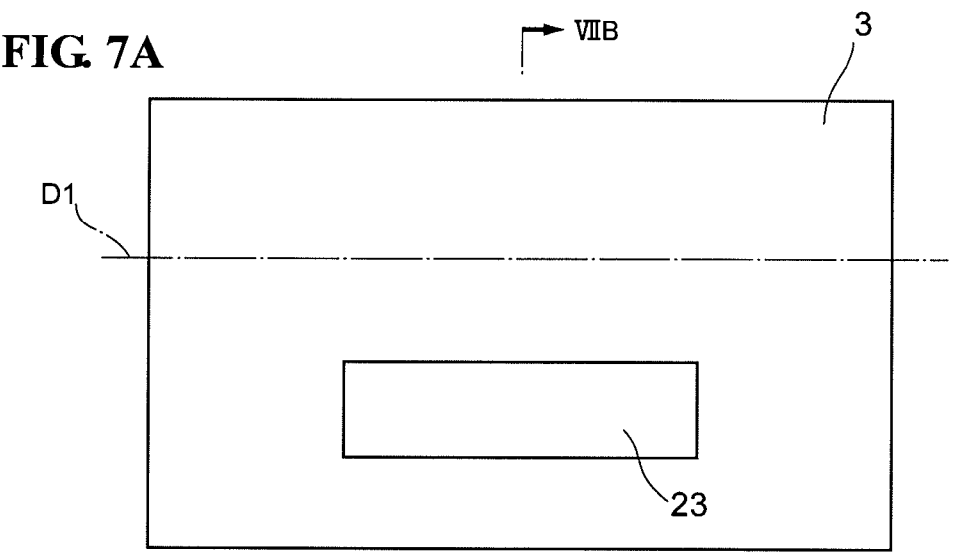
FIGS. 7A and 7B are diagrams for explaining the series of steps involved in carrying out the method of the embodiment.
Figure 7B:
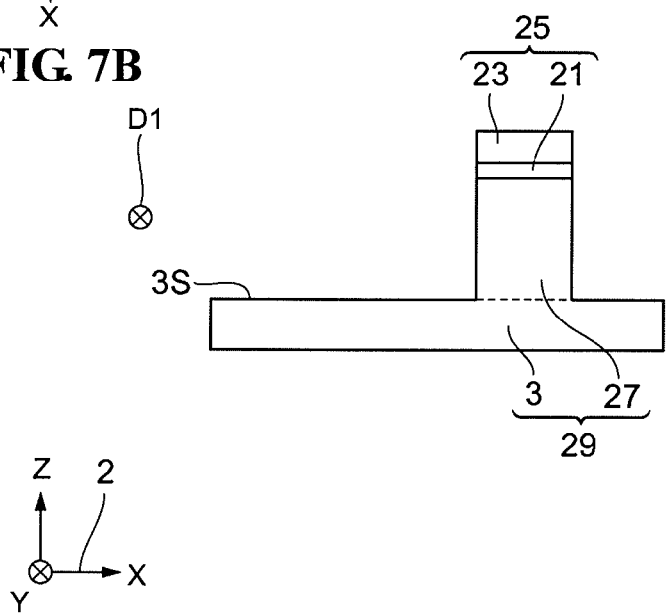

FIGS. 6A and 7A are plan views for explaining the structure forming step. FIG. 6B is a cross-sectional view taken along line VIB-VIB of FIG. 6A. FIG. 7B is a cross-sectional view taken along line VIIB-VIIB of FIG. 7A.

The structure forming step of the present embodiment includes a semiconductor substrate preparing step, a mask forming step, and a semiconductor substrate etching step. In the semiconductor substrate preparing step, a semiconductor substrate 3F is prepared as illustrated in FIGS. 6A and 6B. The semiconductor substrate 3F is made of the same semiconductor material as the semiconductor substrate 3 (see FIGS. 7A and 7B) to be obtained. For example, the semiconductor substrate 3F is made of InP. For example, the semiconductor substrate 3 is plate-like in shape and has a substantially flat surface extending along the XY plane. The semiconductor substrate 3F includes a portion 27P to be formed into a mesa part 27 (see FIGS. 7A and 7B). The portion 27P extends in the first direction D1 along the Y-axis.

In the mask forming step, as illustrated in FIGS. 6A and 6B, a mask 25 is formed on a part of the surface of the semiconductor substrate 3F. In other words, the mask 25 is formed on the portion 27P. The mask 25 of the present embodiment includes a first mask portion (cap layer) 21 formed on the semiconductor substrate 3F and a second mask portion 23 formed on the first mask portion 21. The first mask portion 21 is made of a semiconductor material, such as GaInAsP. The second mask portion 23 is made of a dielectric material, such as silicon oxide ($SiO_2$) or silicon nitride (SiN). The first mask portion 21 of semiconductor material can be formed, for example, by epitaxial growth, such as a metalorganic chemical vapor deposition (MOCVD) method. The second mask portion 23 of dielectric material can be formed, for example, by a plasma chemical vapor deposition (CVD) method.

For forming the mask 25, first, for example, the first mask portion 21 is formed over the entire surface of the semiconductor substrate 3F. Next, the second mask portion 23 is formed over the entire surface of the first mask portion 21. After a resist mask is formed on part of the surface of the second mask portion 23, the second mask portion 23 and the first mask portion 21 are patterned by, for example, dry etching to form the mask 25. Note that the mask 25 does not have to include the first mask portion 21.

In the semiconductor substrate etching step, as illustrated in FIGS. 7A and 7B, the semiconductor substrate 3F is etched, for example, by dry etching using the mask 25 to form a structure 29. The structure 29 includes the mesa part 27 under the mask 25 and the semiconductor substrate 3 under the mesa part 27. The semiconductor substrate 3 has the main surface 3S which is substantially flat. The mesa part 27 protrudes from the main surface 3S of the semiconductor substrate 3 while extending in the first direction D1 parallel to the main surface 3S.

(First Semiconductor Layer Forming Step)

Figure 8A:
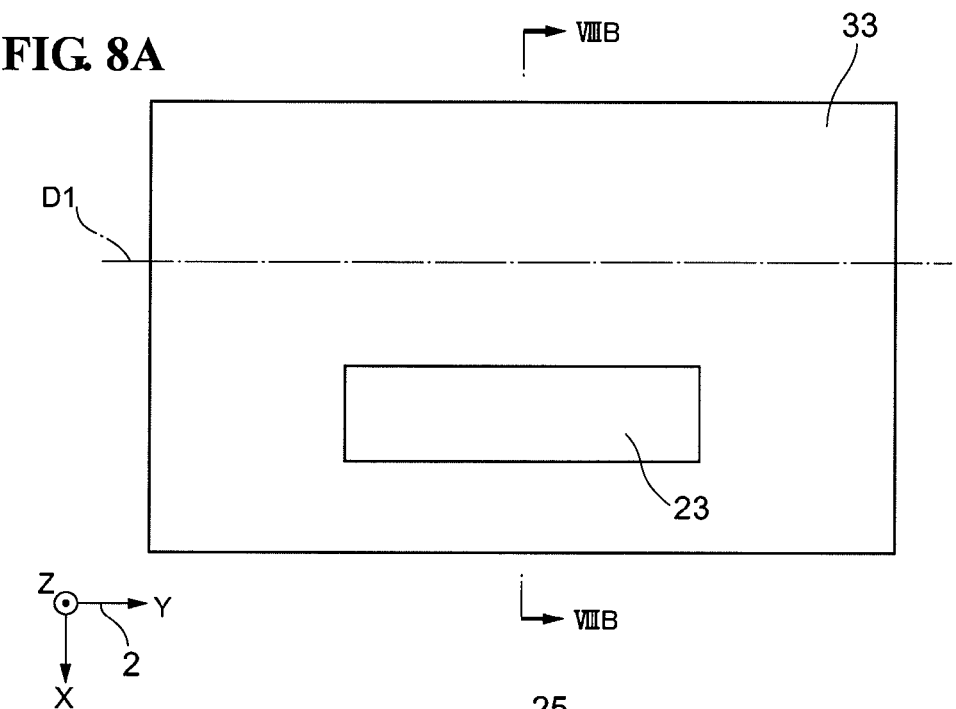
FIGS. 8A and 8B are diagrams for explaining the series of steps involved in carrying out the method of the embodiment.
Figure 8B:
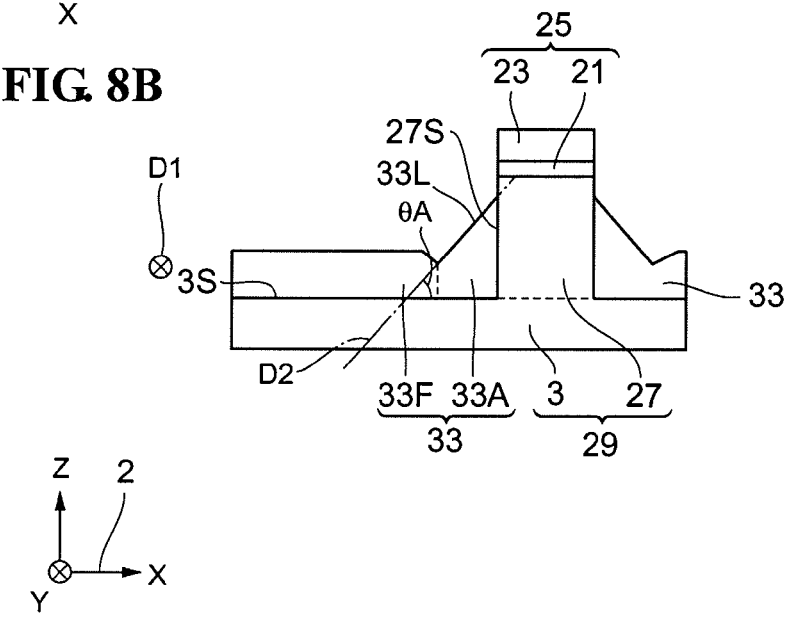

Next, the first semiconductor layer forming step is performed. FIG. 8A is a plan view for explaining the first semiconductor layer forming step. FIG. 8B is a cross-sectional view taken along line VIIIB-VIIIB of FIG. 8A.

In the first semiconductor layer forming step, a first semiconductor layer 33 made of the same material as the first semiconductor cladding 5L (see FIG. 13B) is deposited, for example, by epitaxial growth, such as the MOCVD method, on the main surface 3S of the semiconductor substrate 3. The second mask portion 23 of dielectric material is used as a selective growth mask. The first semiconductor layer 33 is formed by the selective growth. The first semiconductor layer 33 includes a mesa-part-adjacent portion 33A adjacent to a side face 27S of the mesa part 27 and a first non-adjacent portion 33F spaced from the side face 27S of the mesa part 27. By forming the first mask portion 21 of semiconductor material, such as GaInAs, in the mask 25, it is possible to prevent abnormal growth of the first semiconductor layer 33 (33A) on the side face 27S of the mesa part 27 during formation of the first semiconductor layer 33. An overhang of the second mask portion 23 may be formed by selectively etching the first mask portion 21 of semiconductor material, such as GaInAs, using a phosphate etchant (i.e., a mixture of phosphoric acid, hydrogen peroxide, and water). With the overhang of the second mask portion 23 of dielectric material, it is possible to further prevent the abnormal growth of the first semiconductor layer 33 (33A) formed on the side face 27S of the mesa part 27. Additionally, the shape of the first semiconductor layer 33 (33A) formed on the side face 27S of the mesa part 27 can be controlled with high repeatability.

As described above, the first semiconductor layer 33 is deposited on the main surface 3S such that the first semiconductor layer 33 has the mesa-part-adjacent portion 33A. By the presence of the mesa part 27, at least part of the mesa-part-adjacent portion 33A has, in a cross section perpendicular to the first direction D1, an inclined surface 33L which increases in height from the main surface 3S of the semiconductor substrate 3 as it approaches the mesa part 27. The inclined surface 33L extends in the second direction D2 that forms the acute angle θA with the main surface 3S of the semiconductor substrate 3. The angle of inclination of the inclined surface 33L, that is, the acute angle θA can be easily controlled by deposition conditions, such as deposition time and others, under which the first semiconductor layer 33 is deposited. For example, as the thickness of the first semiconductor layer 33 is increased by increasing the time during which the first semiconductor layer 33 is deposited, the acute angle θA is reduced and the surface of the mesa-part-adjacent portion 33A becomes flatter.

Since the first non-adjacent portion 33F is less likely to be affected by the presence of the mesa part 27 as compared to the mesa-part-adjacent portion 33A, the first non-adjacent portion 33F is substantially uniform in thickness and has a substantially flat surface.

(Second Semiconductor Layer Forming Step)

Figure 9A:
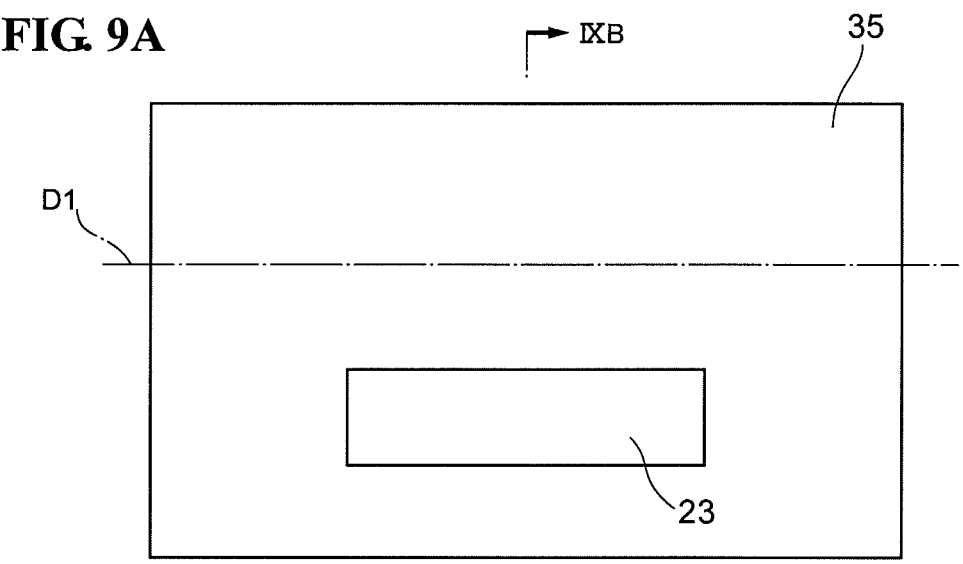
FIGS. 9A and 9B are diagrams for explaining the series of steps involved in carrying out the method of the embodiment.
Figure 9B:
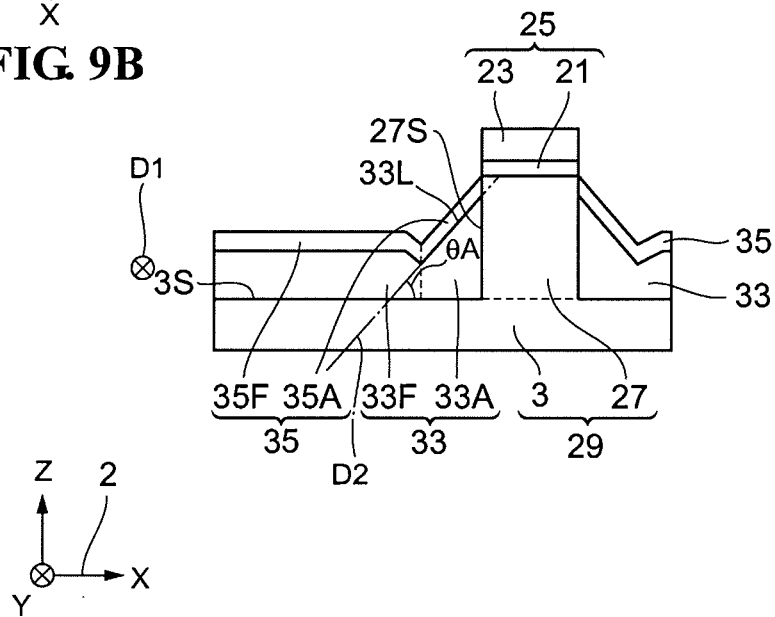

Next, the second semiconductor layer forming step is performed. FIG. 9A is a plan view for explaining the second semiconductor layer forming step. FIG. 9B is a cross-sectional view taken along line IXB-IXB of FIG. 9A.

In the second semiconductor layer forming step, a second semiconductor layer 35 made of the same material as the first semiconductor core 5C (see FIG. 12B) is formed, for example, by epitaxial growth, such as the MOCVD method, on the first semiconductor layer 33. The second mask portion 23 of dielectric material is used as a selective growth mask. The second semiconductor layer 35 is formed by the selective growth. The second semiconductor layer 35 includes an inclined portion 35A adjacent to the side face 27S of the mesa part 27 and located on the inclined surface 33L, and a second non-adjacent portion 35F located on the first non-adjacent portion 33F. The inclined portion 35A of the second semiconductor layer 35 extends along the inclined surface 33L of the mesa-part-adjacent portion 33A of the first semiconductor layer 33. That is, the inclined portion 35A of the second semiconductor layer 35 extends in the second direction D2. By forming the first mask portion 21 of semiconductor material, such as GaInAs, it is possible to prevent abnormal growth of the inclined portion 35A of the second semiconductor layer 35 on the side face 27S of the mesa part 27 during formation of the second semiconductor layer 35. With an overhang of the second mask portion 23, it is possible to further prevent the abnormal growth of the inclined portion 35A of the second semiconductor layer 35 and control the shape of the inclined portion 35A of the second semiconductor layer 35 with high repeatability.

(Third Semiconductor Layer Forming Step)

Next, the third semiconductor layer forming step is performed. FIG. 10A is a plan view for explaining the third semiconductor layer forming step. FIG. 10B is a cross-sectional view taken along line XB-XB of FIG. 10A.

In the third semiconductor layer forming step, a third semiconductor layer 37 made of the same material as the first semiconductor cladding 5L (see FIG. 13B) is deposited, for example, by epitaxial growth, such as the MOCVD method, on the second semiconductor layer 35. The second mask portion 23 of dielectric material is used as a selective growth mask. By forming the first mask portion 21 of semiconductor material, such as GaInAs, it is possible to prevent abnormal growth of the third semiconductor layer 37 during its formation on the side face 27S of the mesa part 27 and on the second semiconductor layer 35. With an overhang of the second mask portion 23, it is possible to further prevent the abnormal growth of the third semiconductor layer 37, and thus the third semiconductor layer 37 having a flat surface can be formed to the height of the first mask portion 21. A semiconductor laminate 39 including the first semiconductor layer 33, the second semiconductor layer 35, and the third semiconductor layer 37 is thus formed on the main surface 3S of the semiconductor substrate 3. The semiconductor laminate 39 is adjacent to the side face 27S of the mesa part 27. Then, the second mask portion 23 of the mask 25 is removed, for example, by wet etching using a hydrofluoric etchant, and the first mask portion 21 is removed by etching using a phosphate etchant (i.e., a mixture of phosphoric acid, hydrogen peroxide, and water).

(Mask Forming Step)

Figure 11A:
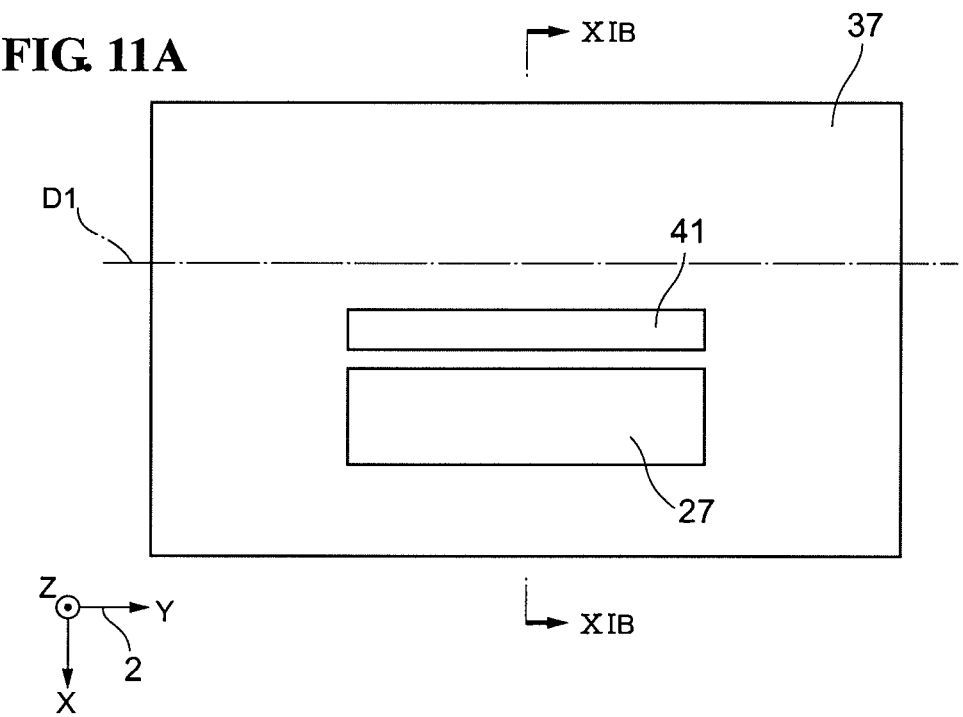
FIGS. 11A and 11B are diagrams for explaining the series of steps involved in carrying out the method of the embodiment.
Figure 11B:
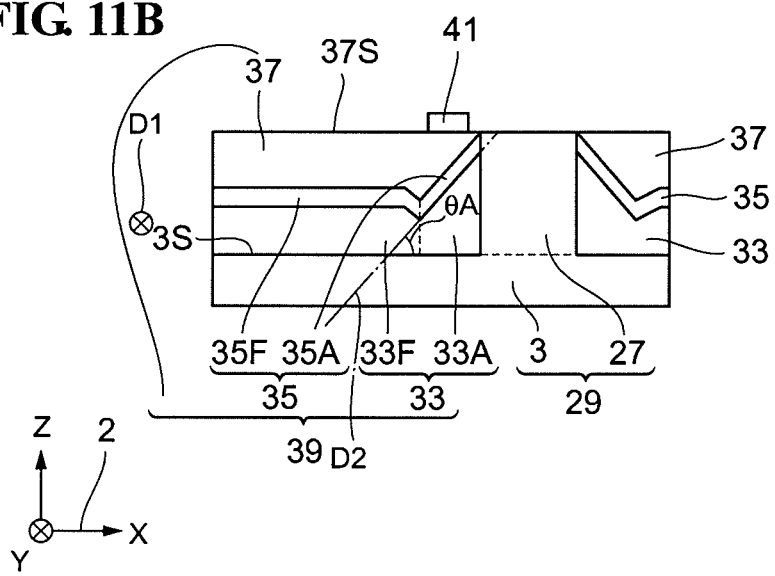

Next, the mask forming step is performed. FIG. 11A is a plan view for explaining the mask forming step. FIG. 11B is a cross-sectional view taken along line XIB-XIB of FIG. 11A.

In the mask forming step, as illustrated in FIGS. 11A and 11B, a mask layer 41 is formed on a surface 37S of the third semiconductor layer 37. The mask layer 41 is located above at least part of the inclined portion 35A of the second semiconductor layer 35. The mask layer 41 extends in the first direction D1. The first semiconductor core 5C (see FIG. 12B) to be formed in the following process is covered by the mask layer 41, with the third semiconductor layer 37 interposed therebetween. Although the mask layer 41 of the present embodiment is spaced from the mesa part 27 in the X-axis direction (parallel to the main surface 3S and orthogonal to the first direction D1), the mask layer 41 may be adjacent to the mesa part 27. The mask layer 41 is made of a dielectric material, such as silicon oxide ($SiO_2$) or silicon nitride (SiN).

(Semiconductor Laminate Etching Step)

Figure 12A:
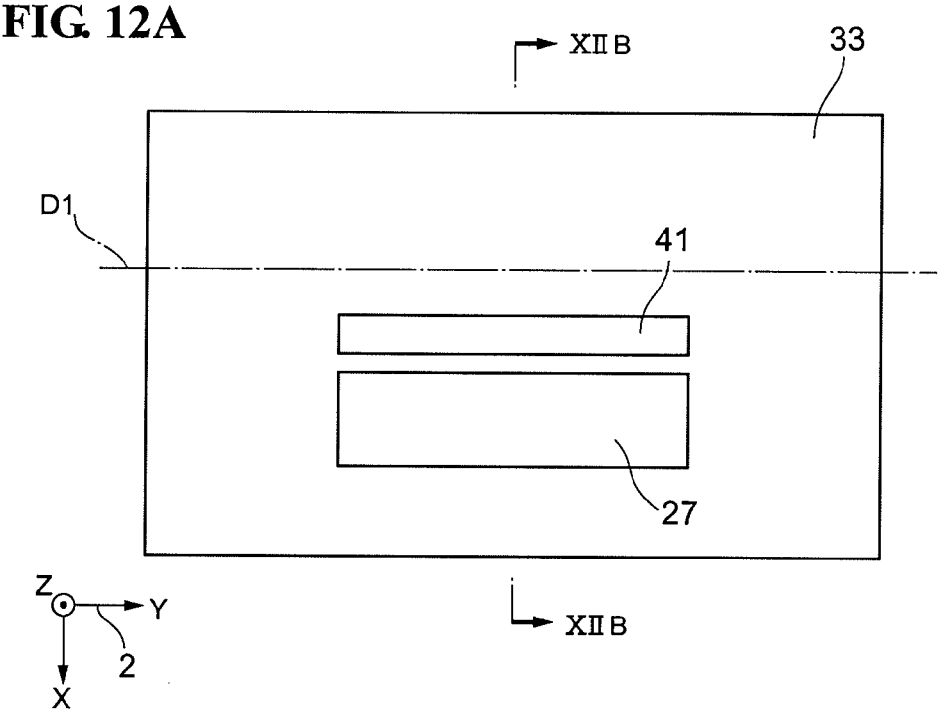
FIGS. 12A and 12B are diagrams for explaining the series of steps involved in carrying out the method of the embodiment.
Figure 12B:
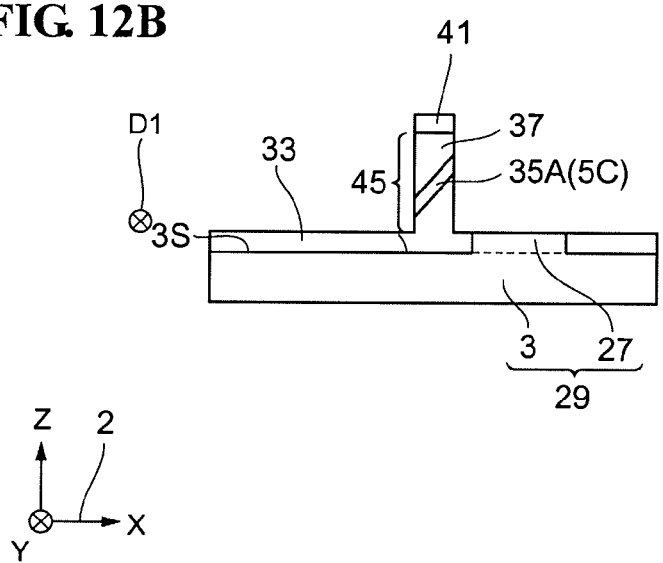

Next, the semiconductor laminate etching step is performed. FIG. 12A is a plan view for explaining the semiconductor laminate etching step. FIG. 12B is a cross-sectional view taken along line XIIB-XIIB of FIG. 12A.

In the semiconductor laminate etching step, as illustrated in FIGS. 12A and 12B, the semiconductor laminate 39 (see FIGS. 11A and 11B) is etched, for example, by dry etching using the mask layer 41 as a mask. In the present embodiment, the second semiconductor layer 35 is etched entirely, except for the part of the inclined portion 35A of the second semiconductor layer 35 below the mask layer 41. Thus, a stripe-shaped mesa 45 protruding in the lamination direction of the semiconductor laminate 39 and extending in the first direction D1 is formed under the mask layer 41. The stripe-shaped mesa 45 includes the first semiconductor core 5C constituted by the inclined portion 35A of the second semiconductor layer 35 below the mask layer 41.

In the present embodiment, the semiconductor laminate 39 is etched such that the first semiconductor layer 33 partially remains. However, the semiconductor laminate 39 may be etched to entirely remove the first semiconductor layer 33. Also in the present embodiment, the semiconductor laminate 39 is etched such that the mesa part 27 partially remains. However, the semiconductor laminate 39 may be etched to entirely remove the mesa part 27.

(Fourth Semiconductor Layer Forming Step, First Waveguide Forming Step, and Second Waveguide Forming Step)

Figure 13A:
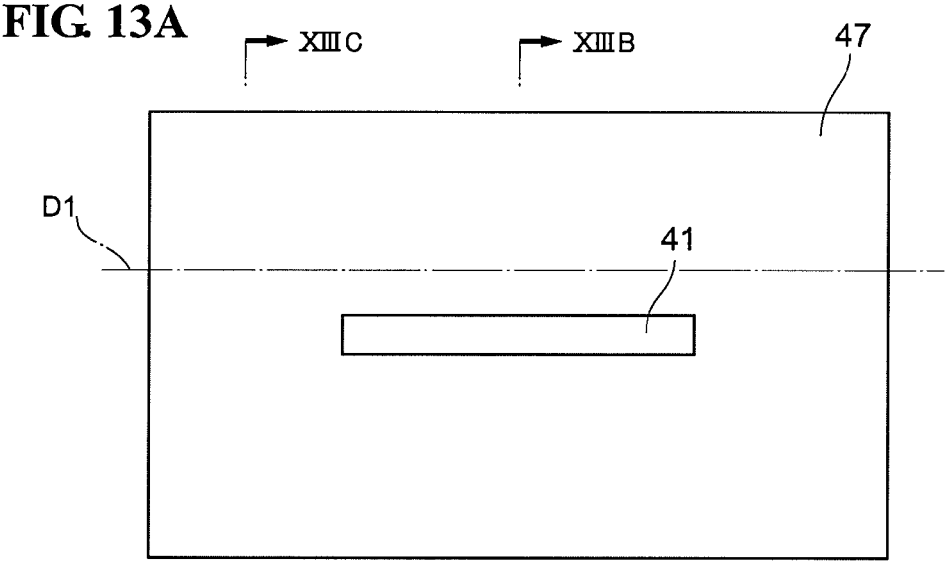
FIGS. 13A to 13C are diagrams for explaining the series of steps involved in carrying out the method of the embodiment.
Figure 13B:
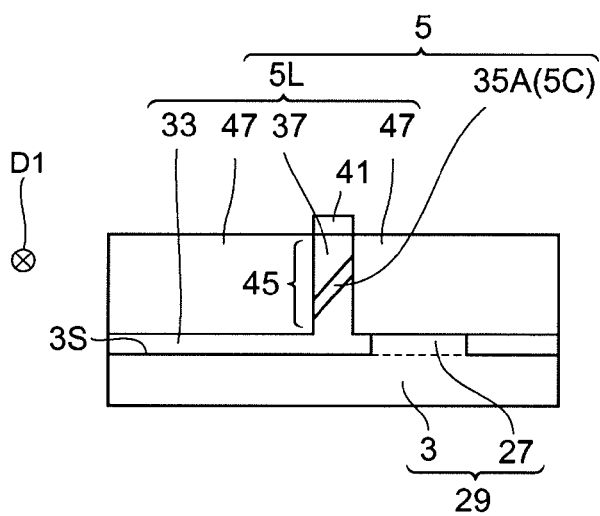
Figure 13C:
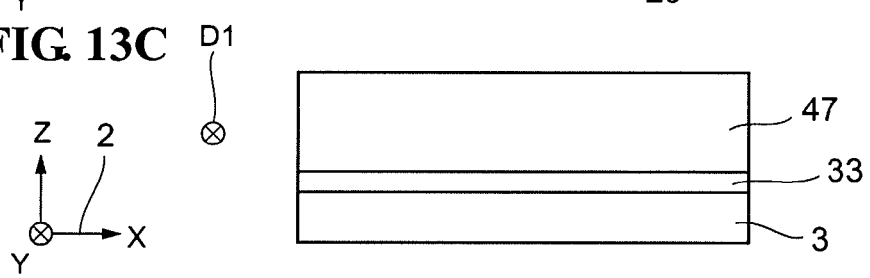

Next, the fourth semiconductor layer forming step, the first waveguide forming step, and the second waveguide forming step are performed. Formation of the polarization rotating unit 5 is completed upon completion of the fourth semiconductor layer forming step. FIGS. 13A, 14A, 15A, and 16A are plan views for explaining the fourth semiconductor layer forming step, the first waveguide forming step, and the second waveguide forming step. FIG. 13B is a cross-sectional view taken along line XIIIB-XIIIB of FIG. 13A. FIG. 13C is a cross-sectional view taken along line XIIIC-XIIIC of FIG. 13A. FIG. 14B is a cross-sectional view taken along line XIVB-XIVB of FIG. 14A. FIG. 14C is a cross-sectional view taken along line XIVC-XIVC of FIG. 14A. FIG. 14D is a cross-sectional view taken along line XIVD-XIVD of FIG. 14A. FIG. 15B is a cross-sectional view taken along line XVB-XVB of FIG. 15A. FIG. 15C is a cross-sectional view taken along line XVC-XVC of FIG. 15A. FIG. 15D is a cross-sectional view taken along line XVD-XVD of FIG. 15A. FIG. 16B is a cross-sectional view taken along line XVIB-XVIB of FIG. 16A. FIG. 16C is a cross-sectional view taken along line XVIC-XVIC of FIG. 16A. FIG. 16D is a cross-sectional view taken along line XVID-XVID of FIG. 16A.

In the steps described above, first, as illustrated in FIGS. 13A to 13C, a fourth semiconductor layer 47 made of the same material as the first semiconductor cladding 5L (see FIG. 13B) is formed, for example, by epitaxial growth such as MOCVD method on the side face of the stripe-shaped mesa 45. The stripe-shaped mesa 45 is buried by the fourth semiconductor layer 47. Thus, the first semiconductor cladding 5L is formed which includes the first semiconductor layer 33, the third semiconductor layer 37, and the fourth semiconductor layer 47. The first semiconductor cladding 5L surrounds the first semiconductor core 5C. Thus, the polarization rotating unit 5 is formed which includes the first semiconductor core 5C and the first semiconductor cladding 5L. Then, the mask layer 41 is removed, for example, by wet etching.

Figure 14A:
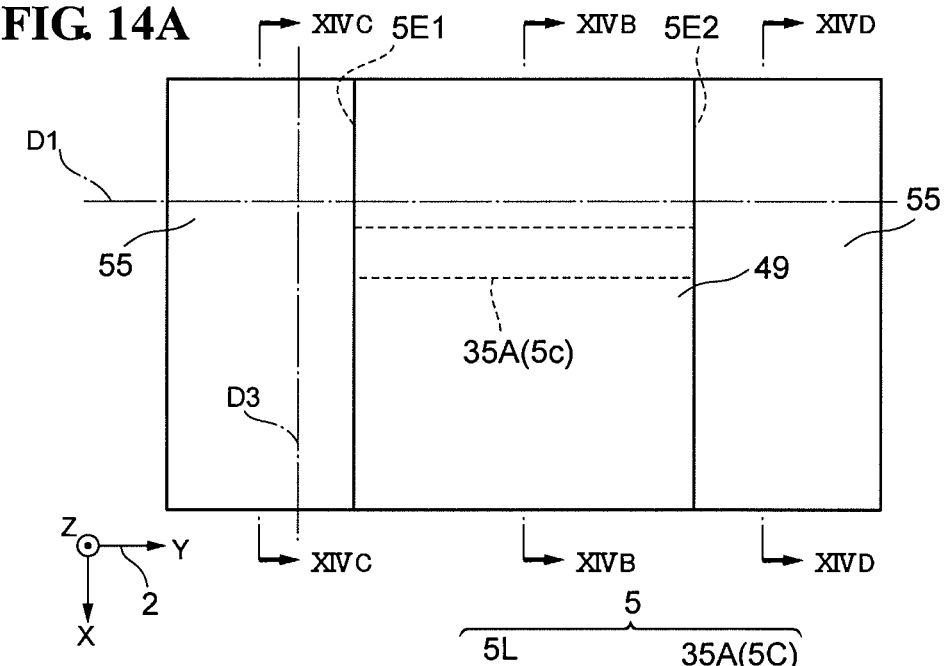
FIGS. 14A to 14D are diagrams for explaining the series of steps involved in carrying out the method of the embodiment.
Figure 14B:
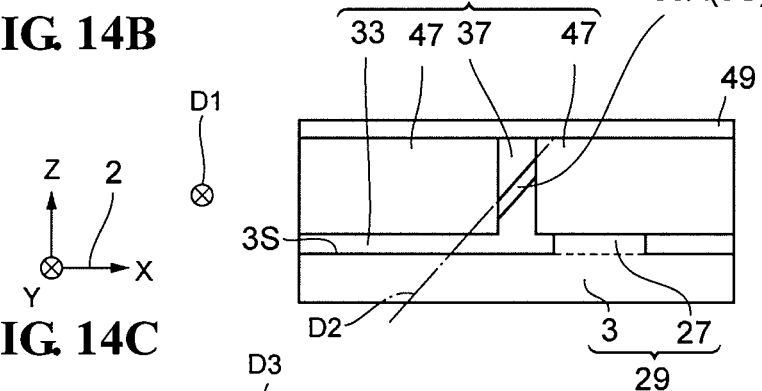
Figure 14C:
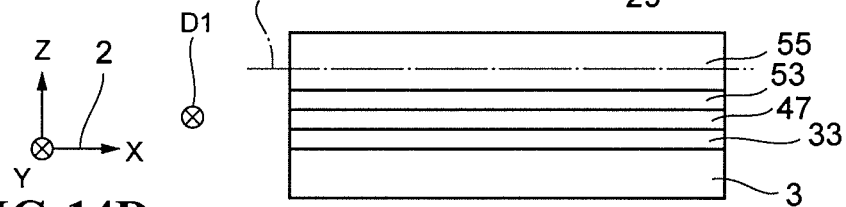
Figure 14D:
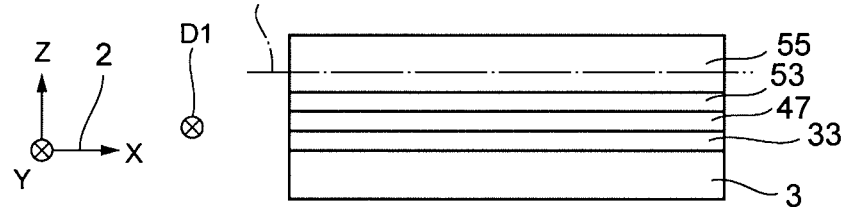

Next, as illustrated in FIGS. 14A and 14B, a mask layer 49 is formed on the third semiconductor layer 37 and the fourth semiconductor layer 47. A length of the mask layer 49 in the first direction D1 corresponds to the final shape of the first semiconductor core 5C (see FIGS. 17A to 17D). That is, the mask layer 49 defines the length of the final shape of the first semiconductor core 5C (see FIGS. 17A to 17D) in the first direction D1.

The mask layer 49 may entirely cover the first semiconductor core 5C, or may partially cover the first semiconductor core 5C such that at least one of both ends of the first semiconductor core 5C in the first direction D1 is left uncovered. The mask layer 49 is made of a dielectric material, such as silicon oxide ($SiO_2$) or silicon nitride (SiN).

Then, the fourth semiconductor layer 47 is etched, using the mask layer 49 as a mask, to expose both ends of the first semiconductor core 5C in the first direction D1. If the mask layer 49 does not cover at least one of both ends of the first semiconductor core 5C in the first direction D1, the at least one of both ends of the first semiconductor core 5C in the first direction D1 is etched together with the fourth semiconductor layer 47. This defines the first end face 5E1 and the second end face 5E2 of the polarization rotating unit 5.

In the present embodiment, as illustrated in FIGS. 14C and 14D, the fourth semiconductor layer 47 is etched halfway, so that portions of the fourth semiconductor layer 47 not covered with the mask layer 49 remain. Alternatively, the fourth semiconductor layer 47 may be etched to entirely remove the portions thereof not covered with the mask layer 49.

Next, as illustrated in FIGS. 14A to 14D, a fifth semiconductor layer 53 and a sixth semiconductor layer 55 are formed in this order in regions adjacent to the respective first end face 5E1 and second end face 5E2 of the polarization rotating unit 5 in the first direction D1, that is, in the regions where the fourth semiconductor layer 47 has been partially removed by etching using the mask layer 49. The fifth semiconductor layer 53 is made of the same semiconductor material as the second semiconductor core 7C and the third semiconductor core 9C (see FIGS. 15A to 15D). The sixth semiconductor layer 55 is made of the same semiconductor material as the second semiconductor cladding 7L and the third semiconductor cladding 9L (see FIGS. 16A to 16D). In a cross section perpendicular to the first direction D1, the fifth semiconductor layer 53 and the sixth semiconductor layer 55 extend in the third direction D3 different from the second direction D2. In the present embodiment, the third direction D3 is parallel to the main surface 3S of the semiconductor substrate 3.

Figure 15A:
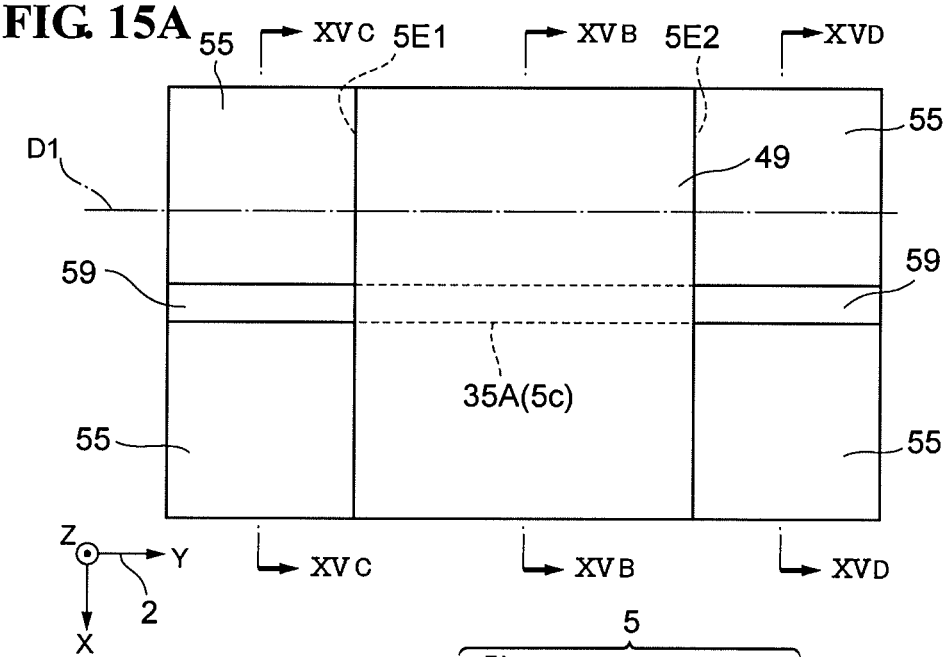
FIGS. 15A to 15D are diagrams for explaining the series of steps involved in carrying out the method of the embodiment.
Figure 15B:
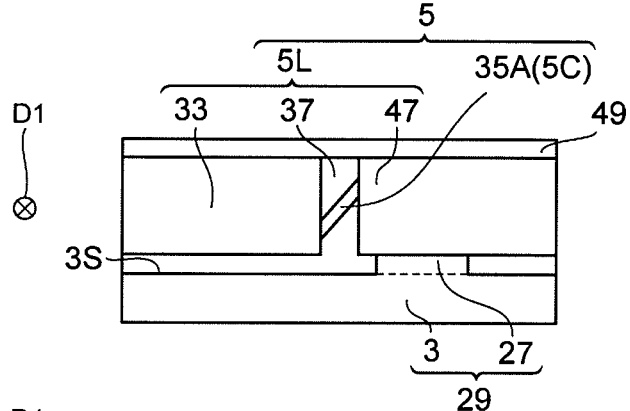
Figure 15C:
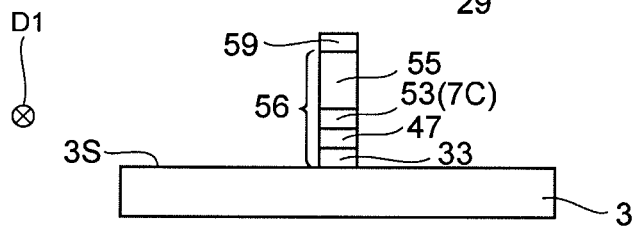
Figure 15D:
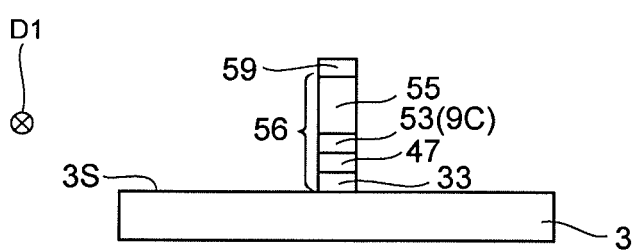
Figure 16A:
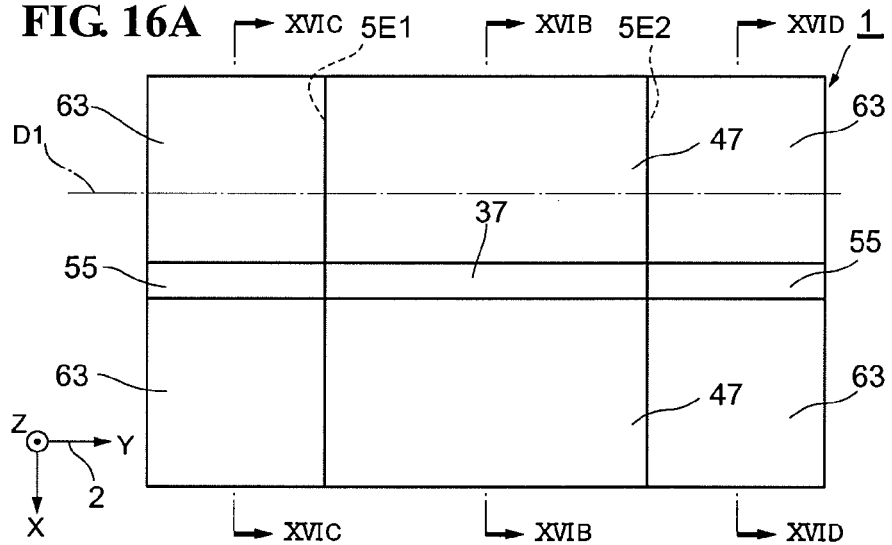
FIGS. 16A to 16D are diagrams for explaining the series of steps involved in carrying out the method of the embodiment.
Figure 16B:
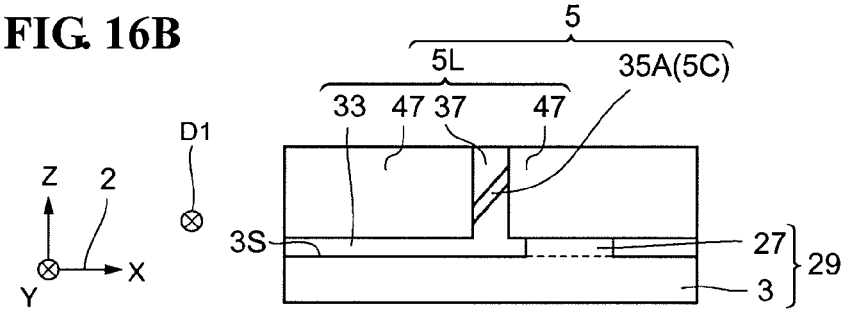
Figure 16C:
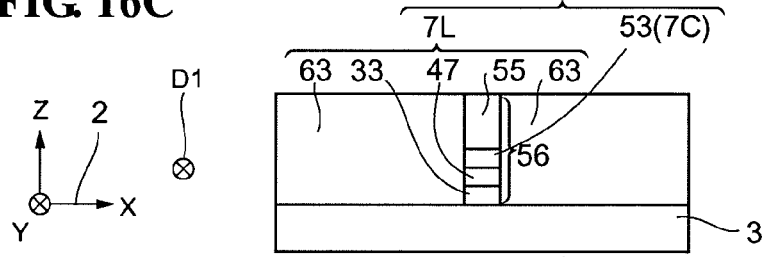
Figure 16D:
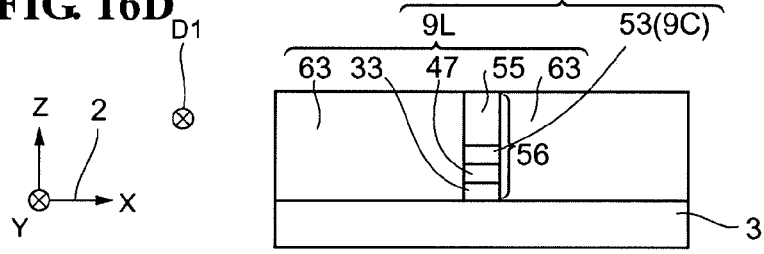

Next, as illustrated in FIG. 15A, two mask layers 59 extending in the first direction D1 are formed on the surface of the sixth semiconductor layer 55. The mask layers 59 are made of a dielectric material, such as silicon oxide ($SiO_2$) or silicon nitride (SiN).

A width of the mask layers 59 in the direction (X-axis direction) perpendicular to the first direction D1 corresponds to the final shape of the second semiconductor core 7C and the third semiconductor core 9C. That is, the mask layers 59 define the width of the final shape of the second semiconductor core 7C and the third semiconductor core 9C in the direction (X-axis direction) perpendicular to the first direction D1.

Next, as illustrated in FIGS. 15C and 15D, the sixth semiconductor layer 55, the fifth semiconductor layer 53, the fourth semiconductor layer 47, and the first semiconductor layer 33 are etched using the mask layer 49 and the mask layers 59. Through this etching, the width of the fifth semiconductor layer 53 in the X-axis direction defines the width of the second semiconductor core 7C and the third semiconductor core 9C in the X-axis direction. Thus, mesa parts 56 are formed under the respective mask layers 59. In the present embodiment, the mesa parts 56 each include the sixth semiconductor layer 55, the fifth semiconductor layer 53, the fourth semiconductor layer 47, and the first semiconductor layer 33 which remain under each of the mask layers 59. The fifth semiconductor layer 53 which remains under the mask layers 59 serves as the second semiconductor core 7C and the third semiconductor core 9C.

In the present embodiment, the etching is performed to expose the main surface 3S of the semiconductor substrate 3. However, the etching may be performed in any manner as long as the width of the fifth semiconductor layer 53 in the X-axis direction defines the width of the second semiconductor core 7C and the third semiconductor core 9C in the X-axis direction. For example, the etching may be performed such that the first semiconductor layer 33 or both the first semiconductor layer 33 and the fourth semiconductor layer 47 remain.

Next, as illustrated in FIGS. 16A to 16D, a seventh semiconductor layer 63 made of the same semiconductor material as the second semiconductor cladding 7L and the third semiconductor cladding 9L is formed on the side faces of the mesa parts 56. Thus, the mesa parts 56 are buried by the seventh semiconductor layer 63. In the steps described above, the second semiconductor cladding 7L including the first semiconductor layer 33, the fourth semiconductor layer 47, the sixth semiconductor layer 55, and the seventh semiconductor layer 63 is formed adjacent to the first end face 5E1 of the polarization rotating unit 5, while the third semiconductor cladding 9L including the first semiconductor layer 33, the fourth semiconductor layer 47, the sixth semiconductor layer 55, and the seventh semiconductor layer 63 is formed adjacent to the second end face 5E2 of the polarization rotating unit 5. The second semiconductor cladding 7L surrounds the second semiconductor core 7C, and the third semiconductor cladding 9L surrounds the third semiconductor core 9C.

Thus, the first waveguide 7 including the second semiconductor cladding 7L and the second semiconductor core 7C is formed adjacent to the first end face 5E1 of the polarization rotating unit 5. Also, the second waveguide 9 including the third semiconductor cladding 9L and the third semiconductor core 9C is formed adjacent to the second end face 5E2 of the polarization rotating unit 5. The first waveguide 7 and the second waveguide 9 are optically coupled to the polarization rotating unit 5. Then, the mask layers 59 are removed.

The polarization rotator 1 of the present embodiment is made by performing the steps described above.

Figure 17A:
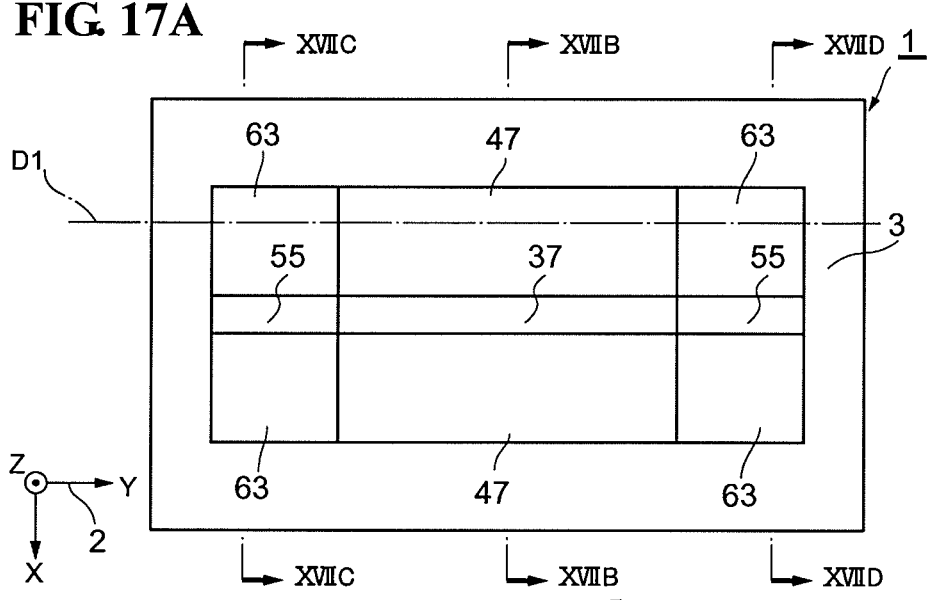
FIGS. 17A to 17D are diagrams for explaining the series of steps involved in carrying out the method of the embodiment.
Figure 17B:
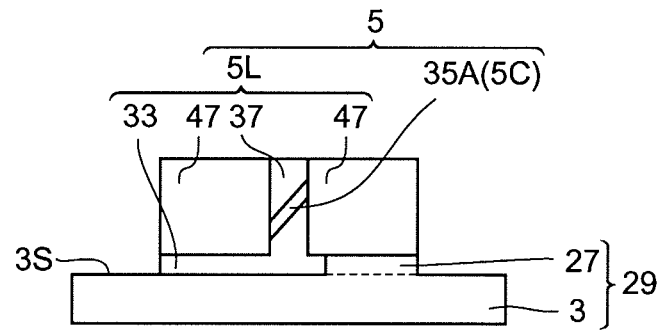
Figure 17C:
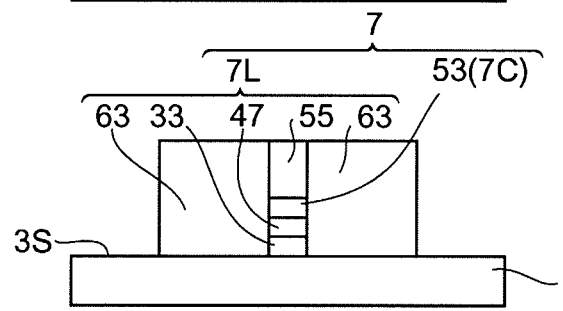
Figure 17D:
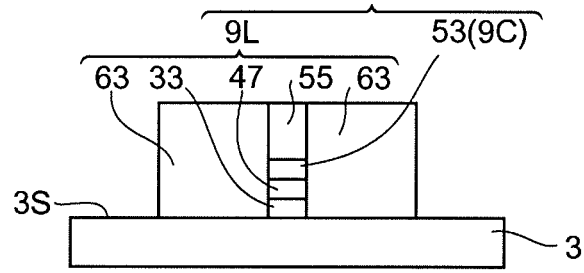

Another step illustrated in FIGS. 17A to 17D may be performed after the steps described above. FIG. 17A is a plan view for explaining a step that can be performed optionally after the fourth semiconductor layer forming step, the first waveguide forming step, and the second waveguide forming step. FIG. 17B is a cross-sectional view taken along line XVIIB-XVIIB of FIG. 17A. FIG. 17C is a cross-sectional view taken along line XVIIC-XVIIC of FIG. 17A. FIG. 17D is a cross-sectional view taken along line XVIID-XVIID of FIG. 17A.

In this step, the polarization rotating unit 5, the first waveguide 7, and the second waveguide 9 are etched such that the first waveguide 7 and the second waveguide 9 have a desired length in the first direction D1, and that the polarization rotating unit 5, the first waveguide 7, and the second waveguide 9 have a desired width orthogonal to the first direction D1 and parallel to the main surface 3S of the semiconductor substrate 3. For the etching, for example, a mask is formed on the surface of a portion of the polarization rotating unit 5, the first waveguide 7, and the second waveguide 9 to be left unetched. Then, the polarization rotating unit 5, the first waveguide 7, and the second waveguide 9 are etched, for example, by dry etching using the mask. Thus, the main surface 3S of the semiconductor substrate 3 is partially exposed.

In the method for making the polarization rotator 1 of the present embodiment described above, the first semiconductor core 5C and the first semiconductor cladding 5L are made of semiconductor materials (see FIGS. 9A to 14D). Therefore, elements of the polarization rotator 1 and other semiconductor devices can be easily monolithically integrated on the main surface 3S of the semiconductor substrate 3.

Also, in the method for making the polarization rotator 1 of the present embodiment, the first semiconductor layer 33 having the mesa-part-adjacent portion 33A is formed in the first semiconductor layer forming step. The mesa-part-adjacent portion 33A has the inclined surface 33L, which extends in the second direction D2 that forms the acute angle θA with the main surface 3S of the semiconductor substrate 3 (see FIGS. 8A and 8B). The mesa-part-adjacent portion 33A having the inclined surface 33L can be easily formed using the structure 29 formed in the structure forming step (see FIGS. 7A to 8B). That is, in the first semiconductor layer forming step, by simply depositing the first semiconductor layer 33 on the main surface 3S of the semiconductor substrate 3 such that the first semiconductor layer 33 is in contact with the side face 27S of the mesa part 27 of the structure 29, the semiconductor material forming the first semiconductor layer 33 is deposited with a thickness which increases toward the mesa part 27. It is thus possible to easily form the mesa-part-adjacent portion 33A having the inclined surface 33L (see FIGS. 7A to 8B).

Next, in the second semiconductor layer forming step, the inclined portion 35A of the second semiconductor layer 35 extending in the second direction D2 can be formed by simply forming the second semiconductor layer 35 on the first semiconductor layer 33 (see FIGS. 9A and 9B). The inclined portion 35A can thus be easily formed. Then, by etching the semiconductor laminate 39 in the semiconductor laminate etching step, at least part of the inclined portion 35A becomes the first semiconductor core 5C (see FIGS. 11A to 12B). Thus, with the method for making the polarization rotator 1 according to the present embodiment, it is possible to easily form the first semiconductor core 5C inclined with respect to the main surface 3S of the semiconductor substrate 3.

With the method for making the polarization rotator 1 of the present embodiment, it is possible to obtain the polarization rotator 1 made of semiconductor materials, and to easily form the first semiconductor core 5C inclined with respect to the main surface 3S of the semiconductor substrate 3.

In the method for making the polarization rotator 1 of the present embodiment, an angle formed by the main surface 3S of the semiconductor substrate 3 and the second direction D2 (i.e., the acute angle θA, see FIGS. 8A to 10B) is preferably between 20 degrees and 80 degrees inclusive. Now, linearly polarized light having a plane of polarization parallel to the main surface 3S (e.g., the TE polarization PL1) or linearly polarized light having a plane of polarization perpendicular to the main surface 3S is incident on the polarization rotating unit 5. When the acute angle θA is greater than or equal to 20 degrees, it is possible to achieve a sufficiently high rotation efficiency of the plane of polarization in the polarization rotating unit 5 (see FIGS. 1 and 3A). Thus, since the length of the polarization rotating unit 5 in the first direction D1 can be reduced, the size of the polarization rotator 1 can be reduced.

In the same manner, when the acute angle θA is smaller than or equal to 80 degrees, it is possible to achieve a sufficiently high rotation efficiency of the plane of polarization in the polarization rotating unit 5 (see FIGS. 1 and 3A).

In the method for making the polarization rotator 1 of the present embodiment, the structure forming step includes the semiconductor substrate preparing step, the mask forming step, and the semiconductor substrate etching step (see FIGS. 6A to 7B). In the semiconductor substrate preparing step, the semiconductor substrate 3F includes the portion 27P to be formed into mesa part 27. In the mask forming step, the mask 25 is formed on the portion 27P of the semiconductor substrate 3F. In the semiconductor substrate etching step, the semiconductor substrate 3F is etched using the mask 25 as a mask. Thus, the mesa part 27 is formed under the mask 25, and the semiconductor substrate 3 is formed under the mesa part 27. In the structure forming step, the structure 29 including the semiconductor substrate 3 and the mesa part 27 can be formed easily.

The method for making the polarization rotator 1 of the present embodiment further includes the first waveguide forming step of forming the first waveguide 7 on the semiconductor substrate 3. The first waveguide 7 is disposed adjacent to the first end face 5E1 of the polarization rotating unit 5 in the first direction D1 and optically coupled to the polarization rotating unit 5. The first waveguide 7 formed in the first waveguide forming step includes the second semiconductor core 7C and the second semiconductor cladding 7L. The second semiconductor core 7C is made of a semiconductor material, extends in the first direction D1, and also extends in the third direction D3 different from the second direction D2 in a cross section perpendicular to the first direction D1. The second semiconductor cladding 7L is made of a semiconductor material and surrounds the second semiconductor core 7C (see FIGS. 14A to 17D).

The direction of the slow axis of the first waveguide 7 (i.e., the direction parallel to the third direction D3) differs from the direction of the slow axis of the polarization rotating unit 5 (i.e., the direction parallel to the second direction D2), as viewed in the first direction D1 (see FIGS. 14B and 14C). Therefore, the first waveguide 7 and the polarization rotating unit 5 differ in polarization-plane rotation characteristics for polarizations of the same polarization state. In the polarization rotator 1 of the present embodiment, the first waveguide 7 guides linearly polarized light from the first end face 7E1 to the second end face 7E2 and to the polarization rotating unit 5 without rotating the plane of polarization. Then, the polarization rotating unit 5 guides the linearly polarized light from the first end face 5E1 to the second end face 5E2 while rotating the plane of polarization, and thereby converts the linear polarization to polarization of different polarization state.

Specifically, for example, as described above, the first waveguide 7 guides light in the TE polarization PL1 from the first end face 7E1 to the second end face 7E2 and to the polarization rotating unit 5 without rotating the plane of polarization. Then, the polarization rotating unit 5 guides light in the TE polarization PL1 from the first end face 5E1 to the second end face 5E2 while rotating the plane of polarization, and thereby converts the TE polarization PL1 to the TM polarization PL2.

The method for making the polarization rotator 1 of the present embodiment further includes the second waveguide forming step of forming the second waveguide 9 on the semiconductor substrate 3. The second waveguide 9 is disposed adjacent to the second end face 5E2 of the polarization rotating unit 5 in the first direction D1 and optically coupled to the polarization rotating unit 5. The second waveguide 9 formed in the second waveguide forming step includes the third semiconductor core 9C and the third semiconductor cladding 9L. The third semiconductor core 9C is made of a semiconductor material, extends in the first direction D1, and also extends in the third direction D3 in a cross section perpendicular to the first direction D1. The third semiconductor cladding 9L is made of a semiconductor material and surrounds the third semiconductor core 9C (see FIGS. 14A to 17D).

The direction of the slow axis of the second waveguide 9 (i.e., the direction parallel to the third direction D3) differs from the direction of the slow axis of the polarization rotating unit 5 (i.e., the direction parallel to the second direction D2), as viewed in the first direction D1 (see FIGS. 14B and 14C). Therefore, the second waveguide 9 and the polarization rotating unit 5 differ in polarization-plane rotation characteristics for polarizations of the same polarization state. In the polarization rotator 1 of the present embodiment, the polarization rotating unit 5 guides linearly polarized light from the first end face 5E1 to the second end face 5E2 and to the second waveguide 9 while rotating the plane of polarization. Then, the second waveguide 9 guides the linearly polarized light from the first end face 9E1 to the second end face 9E2 without rotating the plane of polarization.

Specifically, for example, as described above, the polarization rotating unit 5 guides light in the TE polarization PL1 from the first end face 5E1 to the second end face 5E2 while rotating the plane of polarization, and thereby converts the TE polarization to the TM polarization PL2. Then, the polarization rotating unit 5 guides light in the TM polarization PL2 to the second waveguide 9. The second waveguide 9 guides light in the TM polarization PL2 from the first end face 9E1 to the second end face 9E2 without rotating the plane of polarization.

In the method for making the polarization rotator 1 of the present embodiment, the second direction D2 and the third direction D3 preferably form an angle of about 45 degrees. That is, the angle θ23 formed by the second direction D2 and the third direction D3 is preferably about 45 degrees (see FIG. 3A). Thus, when the first waveguide 7 and the second waveguide 9 guide linearly polarized light without rotating the plane of polarization, the angle formed by the plane of linear polarization and the slow axis of the polarization rotating unit 5 is about 45 degrees. A particularly high rotation efficiency of the plane of polarization in the polarization rotating unit 5 can thus be achieved.

The present invention is not limited to the embodiments described above and various modifications are possible.

For example, although the polarization rotator 1 of the above-described embodiments includes the first waveguide 7 and the second waveguide 9 (see FIGS. 1 to 3C), the polarization rotator 1 may include only one or neither of the first waveguide 7 and the second waveguide 9.

Also, although the method for making the polarization rotator 1 of the above-described embodiments includes the first waveguide forming step and the second waveguide forming step (see FIGS. 14A to 17D), the method for making the polarization rotator 1 may include only one or neither of the first waveguide forming step and the second waveguide forming step.

In the structure forming step of the method for making the polarization rotator 1 according to the embodiments described above, the structure 29 is formed by performing the semiconductor substrate preparing step of preparing the semiconductor substrate 3F, the mask forming step of forming the mask 25, and the semiconductor substrate etching step (see FIGS. 6A to 7B). However, the method for forming the structure 29 is not limited to this. For example, in the structure forming step, the structure 29 may be formed by performing the step of preparing the semiconductor substrate 3 and the step of forming the mesa part 27 on the main surface 3S of the semiconductor substrate 3. In this case, the step of forming the mesa part 27 may include the step of depositing a film over the entire main surface 3S of the semiconductor substrate 3 and the step of etching a portion of the film, except for a portion to be formed into the mesa part 27.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:

1. A method for making a polarization rotator, comprising the steps of:
    forming a structure including a semiconductor substrate and a mesa part, the semiconductor substrate having a main surface, the mesa part extending in a first direction parallel to the main surface of the semiconductor substrate;
    forming a first semiconductor layer on the main surface of the semiconductor substrate and on a side face of the mesa part, the first semiconductor layer having a mesa-part-adjacent portion in contact with the side face of the mesa part, at least part of the mesa-part-adjacent portion having an inclined surface;
    forming a second semiconductor layer on the first semiconductor layer, the second semiconductor layer having an inclined portion located on the inclined surface of the mesa-part-adjacent portion;
    forming a semiconductor laminate by forming a third semiconductor layer on the second semiconductor layer, the semiconductor laminate including the first semiconductor layer, the second semiconductor layer, and the third semiconductor layer;
    forming a mask layer on a surface of the third semiconductor layer, the mask layer extending in the first direction;
    forming a stripe-shaped mesa by etching the semiconductor laminate using the mask layer, the stripe-shaped mesa including a first semiconductor core constituted by at least part of the inclined portion of the second semiconductor layer; and
    forming a first semiconductor cladding by forming a fourth semiconductor layer on a side face of the stripe-shaped mesa, the first semiconductor cladding surrounding the first semiconductor core,
    wherein the first semiconductor core and the first semiconductor cladding form a polarization rotating unit of the polarization rotator;
    the inclined surface of the mesa-part-adjacent portion extends in a second direction that forms an acute angle with the main surface of the semiconductor substrate; and
    in a cross section perpendicular to the first direction, the inclined portion of the second semiconductor layer extends in the second direction.

2. The method according to claim 1, wherein the acute angle formed by the main surface of the semiconductor substrate and the second direction is between 20 degrees and 80 degrees inclusive.

3. The method according to claim 1, wherein the step of forming the structure includes the steps of
    forming a mask on a portion of the semiconductor substrate, the portion being to be formed into the mesa part; and
    forming the mesa part by etching the semiconductor substrate using the mask.

4. The method according to claim 1, further comprising the step of forming a first waveguide on the semiconductor substrate, the first waveguide including a second semiconductor core and a second semiconductor cladding, the first waveguide being disposed adjacent to a first end face of the polarization rotating unit in the first direction and optically coupled to the polarization rotating unit, the second semiconductor core extending in the first direction and also extending in a third direction different from the second direction in a cross section perpendicular to the first direction, the second semiconductor cladding surrounding the second semiconductor core.

5. The method according to claim 4, further comprising the step of forming a second waveguide on the semiconductor substrate, the second waveguide including a third semiconductor core and a third semiconductor cladding, the second waveguide being disposed adjacent to a second end face of the polarization rotating unit in the first direction and optically coupled to the polarization rotating unit, the third semiconductor core extending in the first direction and also extending in the third direction in a cross section perpendicular to the first direction, the third semiconductor cladding surrounding the third semiconductor core.

6. The method according to claim 4, wherein the second direction and the third direction form an angle of about 45 degrees.

* * * * *